United States Patent
Chen et al.

(10) Patent No.: US 10,678,028 B2
(45) Date of Patent: Jun. 9, 2020

(54) OPTICAL IMAGE CAPTURING SYSTEM

(71) Applicant: LARGAN PRECISION CO., LTD., Taichung (TW)

(72) Inventors: Kuan-Ming Chen, Taichung (TW); Tsung-Han Tsai, Taichung (TW); Hsin-Hsuan Huang, Taichung (TW); Chun-Che Hsueh, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 16/355,866

(22) Filed: Mar. 18, 2019

(65) Prior Publication Data

US 2019/0227286 A1    Jul. 25, 2019

Related U.S. Application Data

(63) Continuation of application No. 15/698,632, filed on Sep. 7, 2017, now Pat. No. 10,281,684, which is a continuation of application No. 14/955,058, filed on Dec. 1, 2015, now Pat. No. 9,791,672, which is a continuation of application No. 13/788,144, filed on Feb. 27, 2013, now Pat. No. 9,235,027.

(30) Foreign Application Priority Data

Feb. 4, 2013 (TW) .............................. 102104229 A

(51) Int. Cl.
*G02B 13/00* (2006.01)
*G02B 9/62* (2006.01)
*G02B 27/00* (2006.01)

(52) U.S. Cl.
CPC ........... *G02B 13/0045* (2013.01); *G02B 9/62* (2013.01); *G02B 27/0025* (2013.01)

(58) Field of Classification Search
CPC .............................. G02B 13/0045; G02B 9/62
USPC ......................................... 359/713, 756–762
See application file for complete search history.

(56) References Cited

U.S. PATENT DOCUMENTS

| 5,513,042 A | 4/1996 | Itoh et al. |
| 5,543,970 A | 8/1996 | Hata et al. |
| 5,642,229 A | 6/1997 | Kaneko et al. |

(Continued)

FOREIGN PATENT DOCUMENTS

| CN | 201383031 Y | 1/2010 |
| CN | 101365975 B | 10/2010 |

(Continued)

*Primary Examiner* — Zachary W Wilkes
(74) *Attorney, Agent, or Firm* — CKC & Partners Co., LLC

(57) ABSTRACT

An optical image capturing system includes, in order from an object side to an image side, a first lens element, a second lens element, a third lens element, a fourth lens element, a fifth lens element and a sixth lens element. The first lens element with positive refractive power has a convex object-side surface. The second lens element and the third lens element have refractive power. The fourth lens element with negative refractive power has a concave object-side surface and a convex image-side surface. The fifth lens element with positive refractive power has a convex object-side surface, wherein at least one inflection point is on at least one surface thereof. The sixth lens element with negative refractive power has a concave object-side surface. The surfaces of the fifth and the sixth lens elements are aspheric. The optical image capturing system has a total of six lens elements.

26 Claims, 21 Drawing Sheets

(56) References Cited

U.S. PATENT DOCUMENTS

| | | |
|---|---|---|
| 6,014,265 A | 1/2000 | Kato et al. |
| 6,028,717 A | 2/2000 | Kohno et al. |
| 6,411,443 B1 | 6/2002 | Kato et al. |
| 7,869,142 B2 | 1/2011 | Chen et al. |
| 8,000,031 B1 | 8/2011 | Tsai |
| 8,335,043 B2 | 12/2012 | Huang |
| 8,385,006 B2 | 2/2013 | Tsai et al. |
| 8,432,619 B2 | 4/2013 | Huang |
| 8,514,499 B2 | 8/2013 | Hsu et al. |
| 8,643,957 B2 | 2/2014 | Chen et al. |
| 8,687,292 B2 | 4/2014 | Tsai et al. |
| 8,717,685 B2 | 5/2014 | Tsai et al. |
| 8,743,483 B2 | 6/2014 | Hsu et al. |
| 8,749,896 B2 | 6/2014 | Shinohara |
| 8,854,744 B2 | 10/2014 | Liao et al. |
| 8,891,177 B2 | 11/2014 | Huang |
| 8,891,183 B2 | 11/2014 | Tsai et al. |
| 8,908,287 B2 | 12/2014 | Lai |
| 8,934,178 B2 | 1/2015 | Tang et al. |
| 9,235,027 B2 | 1/2016 | Chen et al. |
| 9,488,802 B2 | 11/2016 | Chen et al. |
| 2012/0314304 A1 | 12/2012 | Huang |
| 2013/0010181 A1 | 1/2013 | Baba |
| 2013/0342918 A1 | 12/2013 | Kubota et al. |
| 2014/0063323 A1 | 3/2014 | Yamazaki et al. |
| 2015/0109685 A1 | 4/2015 | Shinohara et al. |

FOREIGN PATENT DOCUMENTS

| | | |
|---|---|---|
| CN | 101553748 B | 12/2010 |
| CN | 101606095 B | 6/2011 |
| JP | H06281857 A | 10/1994 |
| JP | H112762 A | 1/1999 |
| JP | 2010145648 A | 7/2010 |
| TW | 201234038 A | 8/2012 |
| TW | 201239446 A | 10/2012 |
| TW | 201250277 A | 12/2012 |
| WO | 2012169778 A2 | 12/2012 |

OPTICAL IMAGE CAPTURING SYSTEM

RELATED APPLICATIONS

The present application is a continuation of the application Ser. No. 15/698,632, filed on Sep. 7, 2017, which is a continuation of the application Ser. No. 14/955,058, filed on Dec. 1, 2015, U.S. Pat. No. 9,791,672 issued on Oct. 17, 2017, which is a continuation of the application Ser. No. 13/778,144, filed on Feb. 27, 2013, U.S. Pat. No. 9,235,027 issued on Jan. 12, 2016, and claims priority to Taiwan application serial number 102104229, filed on Feb. 4, 2013, the entire contents of which are hereby incorporated herein by reference.

BACKGROUND

Technical Field

The present disclosure relates to an optical image capturing system. More particularly, the present disclosure relates to a compact optical image capturing system applicable to electronic products.

Description of Related Art

In recent years, with the popularity of mobile products having camera functionalities, the demand of miniaturized photographing systems has been increasing. The sensor of a conventional photographing system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact photographing systems have gradually evolved toward the field of higher megapixels, there is an increasing demand for compact photographing systems featuring better image quality.

A conventional photographing system employed in a portable electronic product mainly adopts a four-element lens structure or a five-element lens structure such as the ones disclosed in the U.S. Pat. No. 7,869,142 and the U.S. Pat. No. 8,000,031. Due to the popularity of mobile products with high-end specifications, such as smart phones and PDAs (Personal Digital Assistants), the requirements for high resolution and image quality of present compact photographing systems increase significantly. However, the conventional photographing system cannot satisfy these requirements of the compact photographing systems.

Other conventional compact photographing systems with six-element lens structure such as the one disclosed in the U.S. Publication No. 2012/0314304 A1 enhance image quality and resolution. However, the shape of the object-side surface of the fifth lens element cannot effectively control the angle at which the incident light projects onto an image sensor from every field. Therefore, this photographing system tends to produce more spherical aberration, coma aberration and astigmatism which will influence image quality.

SUMMARY

According to one aspect of the present disclosure, an optical image capturing system includes, in order from an object side to an image side, a first lens element, a second lens element, a third lens element, a fourth lens element, a fifth lens element and a sixth lens element. The first lens element with positive refractive power has a convex object-side surface. The second lens element has refractive power. The third lens element has refractive power. The fourth lens element with negative refractive power has a concave object-side surface and a convex image-side surface. The fifth lens element with positive refractive power has a convex object-side surface, wherein the object-side surface and an image-side surface of the fifth lens element are aspheric; and the fifth lens element has at least one inflection point on at least one of the object-side surface and the image-side surface thereof. The sixth lens element with negative refractive power has a concave object-side surface, wherein the object-side surface and an image-side surface of the sixth lens element are aspheric. The optical image capturing system has a total of six lens elements with refractive power. When a curvature radius of the object-side surface of the fifth lens element is R9, a curvature radius of the image-side surface of the fifth lens element is R10, a central thickness of the third lens element is CT3, and a central thickness of the fourth lens element is CT4, the following relationships are satisfied:

$$0 < R9|R10| < 2.3; \text{ and}$$

$$0.1 < CT4/CT3 < 1.3.$$

According to another aspect of the present disclosure, an optical image capturing system includes, in order from an object side to an image side, a first lens element, a second lens element, a third lens element, a fourth lens element, a fifth lens element and a sixth lens element. The first lens element with positive refractive power has a convex object-side surface. The second lens element with negative refractive power has a concave image-side surface. The third lens element has refractive power. The fourth lens element with negative refractive power has a concave object-side surface and a convex image-side surface. The fifth lens element with positive refractive power has a convex object-side surface, wherein the object-side surface and an image-side surface of the fifth lens element are aspheric; and the fifth lens element has at least one inflection point on at least one of the object-side surface and the image-side surface thereof. The sixth lens element with negative refractive power has a concave object-side surface, wherein the object-side surface and an image-side surface of the sixth lens element are aspheric. The optical image capturing system has a total of six lens elements with refractive power. When a curvature radius of the object-side surface of the fifth lens element is R9, a curvature radius of the image-side surface of the fifth lens element is R10, an Abbe number of the fourth lens element is V4, and an Abbe number of the fifth lens element is V5, the following relationships are satisfied:

$$0 < R9/|R10| < 2.3; \text{ and}$$

$$0.2 < V4/V5 < 0.6.$$

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
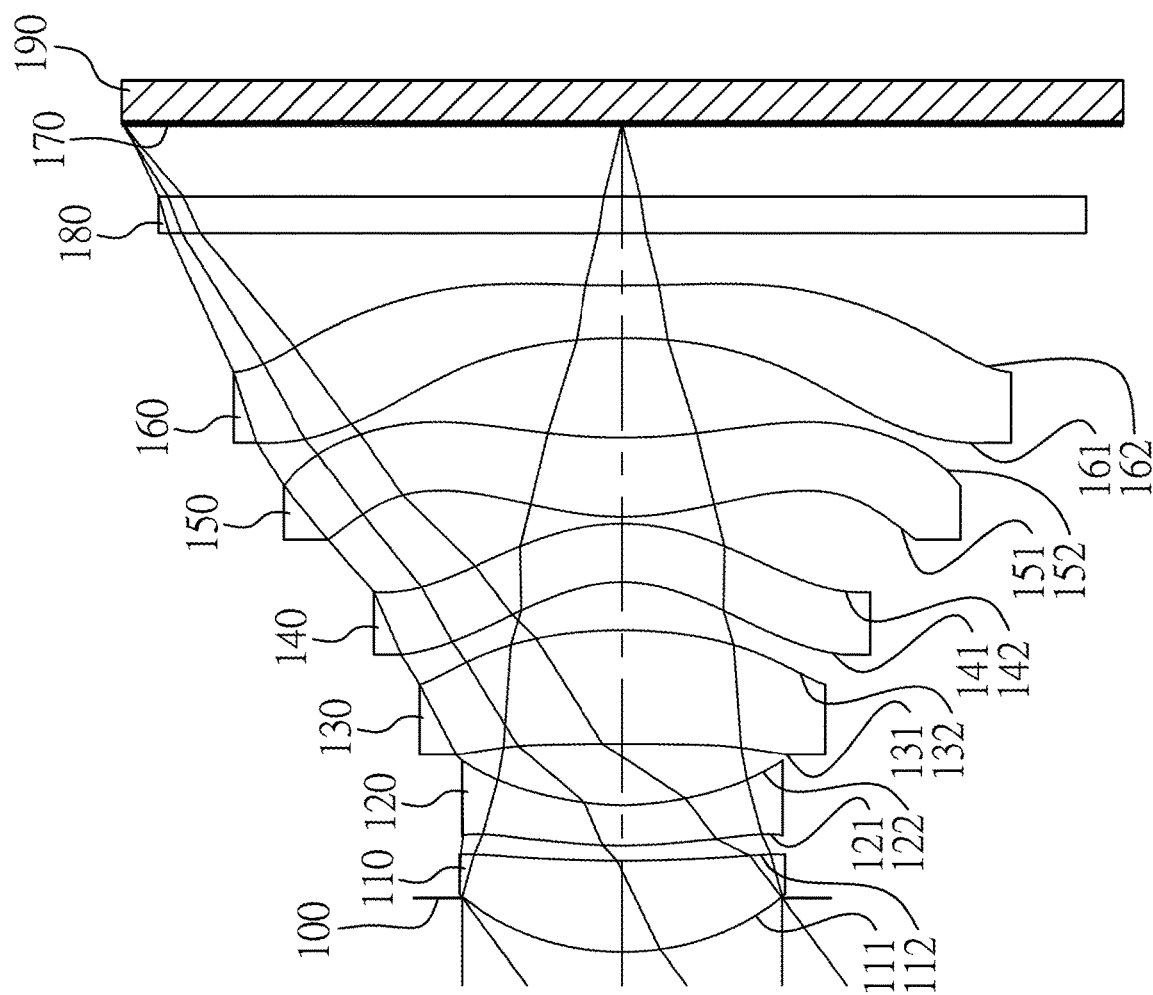
FIG. 1 is a schematic view of an optical image capturing system according to the 1st embodiment of the present disclosure.

An optical image capturing system includes, in order from an object side to an image side, a first lens element, a second lens element, a third lens element, a fourth lens element, a fifth lens element and a sixth lens element. The optical image capturing system has a total of six lens elements with refractive power. The optical image capturing system can further include an image sensor located on an image plane.

The first lens element with positive refractive power has a convex object-side surface, and can have a concave image-side surface. Therefore, the positive refractive power of the first lens element can be adjusted for reducing the total track length of the optical image capturing system.

The second lens element can have negative refractive power, a convex object-side surface and a concave image-side surface. Therefore, it is favorable for correcting the aberration generated from the first lens element. Furthermore, the surface shape of the second lens element is favorable for correcting the astigmatism.

The third lens element can have positive refractive power and a convex image-side surface, so that the positive refractive power of the first lens element can be evenly distributed so as to prevent the spherical aberration from being excessively large, and thereby the photosensitivity of the optical image capturing system is reduced effectively.

The fourth lens element with negative refractive power has a concave object-side surface and a convex image-side surface, so that that astigmatism and the Petzval Sum of the optical image capturing system can be favorably corrected so as to make the image plane more flat.

The fifth lens element with positive refractive power has a convex object-side surface, and can have a concave image-side surface. The fifth lens element has at least one inflection point on at least one of the object-side surface and the image-side surface thereof. Therefore, the angle at which the incident light projects onto the image sensor from every field can be effectively regulated. It is also favorable for reducing the spherical aberration and correcting the coma aberration as well as the astigmatism of the off-axis.

The sixth lens element with negative refractive power has a concave object-side surface, and can have a concave image-side surface. Therefore, the principal point of the optical image capturing system can be positioned away from the image plane so as to reduce the back focal length to keep the optical image capturing system compact. Furthermore, the sixth lens element has at least one inflection point on at least one of the object-side surface and the image-side surface thereof. It is favorable for effectively reducing the angle at which the incident light projects onto the image sensor from the off-axis so as to correct the aberration of the off-axis.

When a curvature radius of the object-side surface of the fifth lens element is R9, and a curvature radius of the image-side surface of the fifth lens element is R10, the following relationship is satisfied: $0<R9/|R10|<2.3$. Therefore, the optical image capturing system is favorable for better adjusting the light path so as to improve image quality. Preferably, the following relationship is satisfied: $0<R9/|R10|<1.5$. More preferably, the following relationship is satisfied: $0<R9/|R10|<0.8$.

When a central thickness of the third lens element is CT3, and a central thickness of the fourth lens element is CT4, the following relationship is satisfied: $0.1<CT4/CT3<1.3$. By such an arrangement, the thickness of the lens elements is thereby favorable for preventing the lens elements from being deformed.

When an axial distance between the fourth lens element and the fifth lens element is T45, and an axial distance between the fifth lens element and the sixth lens element is T56, the following relationship is satisfied: $0<T45/T56<0.2$. Therefore, it is favorable for assembling the lens elements so as to increase the manufacturing yield rate.

When a curvature radius of the object-side surface of the fourth lens element is R7, and a curvature radius of the image-side surface of the fourth lens element is R8, the following relationship is satisfied: −0.4<(R7−R8)/(R7+R8)<−0.1. Therefore, it is favorable for correcting the astigmatism of the optical image capturing system.

When a focal length of the second lens element is f2, and a focal length of the sixth lens element is f6, the following relationship is satisfied: 0.40<f6/f2<0.85. Therefore, it is favorable for correcting the aberration of the optical image capturing system so as to effectively reduce the total track length.

When a distance in parallel with an optical axis from an axial vertex on the object-side surface of the sixth lens element to a maximum effective diameter position on the object-side surface of the sixth lens element is Sag61 (When the distance towards the image side of the optical image capturing system is positive, and when the distance towards the object side of the optical image capturing system is negative), and a central thickness of the sixth lens element is CT6, the following relationship is satisfied: −3.2<Sag61/CT6<−1.0. Therefore, it is favorable for manufacturing and shaping the lens elements so as to effectively keep the optical image capturing system compact.

When a vertical distance between a non-axial critical point on the object-side surface of the fifth lens element and an optical axis is Yc51, and a vertical distance between a non-axial critical point on the image-side surface of the fifth lens element and the optical axis is Yc52, the following relationship is satisfied: 0.5<Yc5/Yc52<1.5. Therefore, it is favorable for correcting the aberration of the off-axis.

When a curvature radius of the object-side surface of the second lens element is R3, and a curvature radius of the image-side surface of the second lens element is R4, the following relationship is satisfied: 0.10<(R3−R4)/(R3+R4)<0.55. Therefore, it is favorable for correcting the astigmatism of the optical image capturing system.

When a curvature radius of the object-side surface of the sixth lens element is R11, and a curvature radius of the image-side surface of the sixth lens element is R12, the following relationship is satisfied: −1.2<R11/R12<0.2. Therefore, it is favorable for reducing the back focal length of the optical image capturing system so as to keep the system compact.

When an Abbe number of the fourth lens element is V4, and an Abbe number of the fifth lens element is V5, the following relationship is satisfied: 0.2<V4/V5<0.6. Therefore, the chromatic aberration of the optical image capturing system can be corrected.

When a focal length of the first lens element is f1, and a focal length of the fifth lens element is f5, the following relationship is satisfied: 0.6<f1/f5<1.1. Therefore, it is favorable for reducing the sensitivity of the optical image capturing system.

The optical image capturing system can further include the image sensor located on the image plane. When an axial distance between the object-side surface of the first lens element and the image plane is TL, and a maximum image height of the optical image capturing system (half of a diagonal length of an effective photosensitive area of the image sensor) is ImgH, the following relationship is satisfied: TL/ImgH<1.75. Therefore, it is favorable for keeping the optical image capturing system compact so as to be applied to portable electronic products.

According to the optical image capturing system of the present disclosure, the lens elements thereof can be made of glass or plastic material. When the lens elements are made of glass material, the distribution of the refractive power of the optical image capturing system may be more flexible to design. When the lens elements are made of plastic material, the manufacturing cost can be effectively reduced. Furthermore, the surface of each lens element can be aspheric, so that it is easier to make the surface into non-spherical shapes. As a result, more controllable variables are obtained, and the aberration is reduced, as well as the number of required lens elements can be reduced while constructing an optical image capturing system. The total track length of the optical image capturing system can thereby be reduced.

According to the optical image capturing system of the present disclosure, when the lens element has a convex surface, it indicates that the surface is convex at the paraxial region; and when the lens element has a concave surface, it indicates that the surface is concave at the paraxial region.

According to the optical image capturing system of the present disclosure, there can be at least one stop provided, such as an aperture stop, a glare stop, or a field stop. Said glare stop or said field stop is allocated for reducing the stray light and thereby improving the image resolution thereof.

Furthermore, an aperture stop can be configured as a front stop or a middle stop. A front stop disposed between the object and the first lens element can provide a longer distance from an exit pupil of the system to an image plane and thereby the generated telecentric effect improves the image-sensing efficiency of an image sensor. A middle stop disposed between the first lens element and the image plane is favorable for enlarging the field of view of the system and thereby provides a wider field of view for the same.

According to the optical image capturing system of the present disclosure, a critical point is a non-axial point of the lens surface where its tangent is perpendicular to the optical axis.

According to the optical image capturing system of the present disclosure, the optical image capturing system is featured with good correction ability and high image quality, and can be applied to 3D (three-dimensional) image capturing applications, in products such as digital cameras, mobile devices and tablets.

According to the above description of the present disclosure, the following 1st-10th specific embodiments are provided for further explanation.

1st Embodiment

Figure 2:
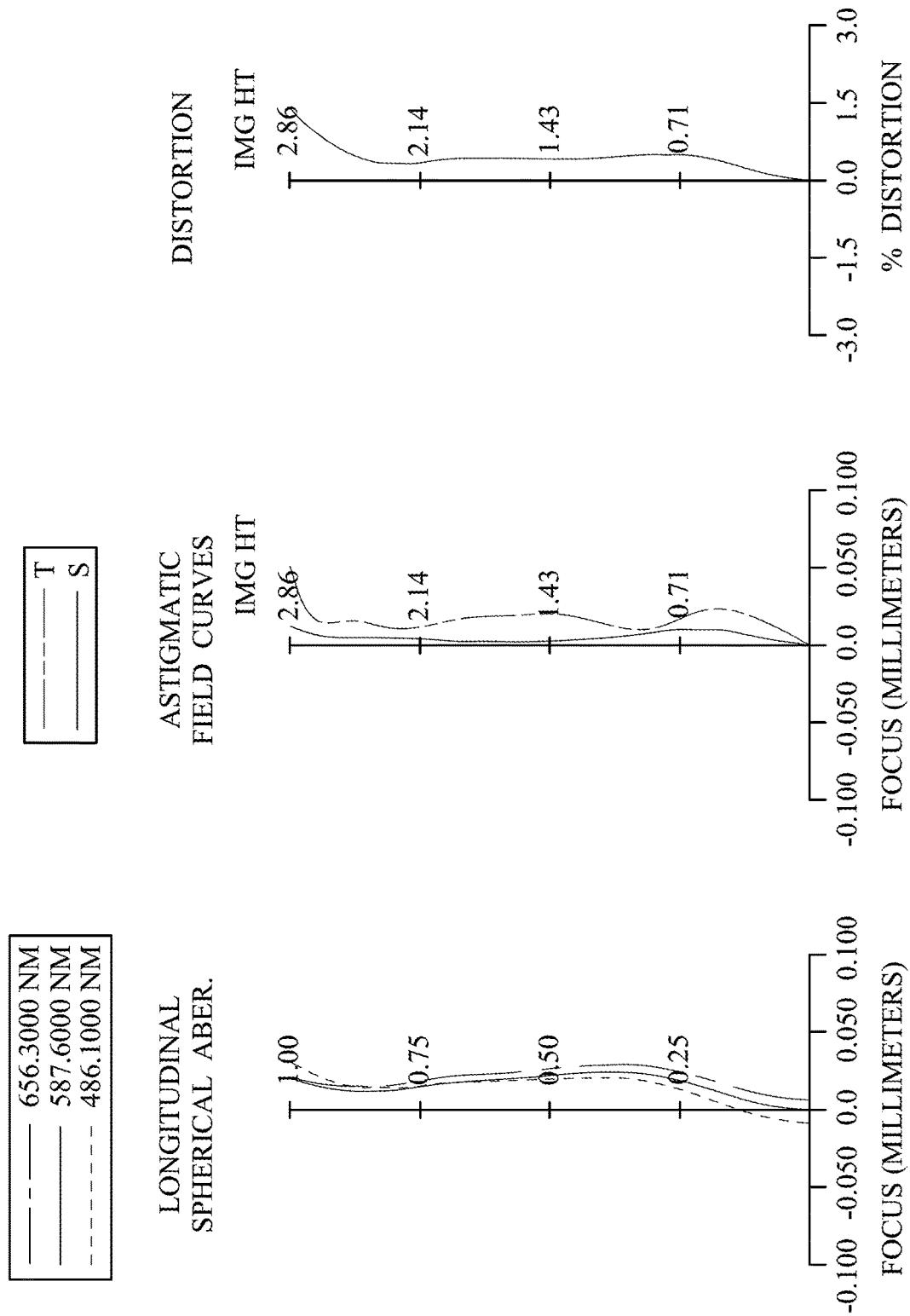
FIG. 2 shows spherical aberration curves, astigmatic field curves and a distortion curve of the optical image capturing system according to the 1st embodiment.

FIG. 1 is a schematic view of an optical image capturing system according to the 1st embodiment of the present disclosure. FIG. 2 shows spherical aberration curves, astigmatic field curves and a distortion curve of the optical image capturing system according to the 1st embodiment. In FIG. 1, the optical image capturing system includes, in order from an object side to an image side, an aperture stop 100, a first lens element 110, a second lens element 120, a third lens element 130, a fourth lens element 140, a fifth lens element 150, a sixth lens element 160, an IR-cut filter 180, an image plane 170 and an image sensor 190.

The first lens element 110 with positive refractive power has a convex object-side surface 111 and a concave image-side surface 112, and is made of plastic material. The object-side surface 111 and the image-side surface 112 of the first lens element 110 are aspheric.

The second lens element 120 with negative refractive power has a convex object-side surface 121 and a concave image-side surface 122, and is made of plastic material. The object-side surface 121 and the image-side surface 122 of the second lens element 120 are aspheric.

The third lens element 130 with positive refractive power has a concave object-side surface 131 and a convex image-side surface 132, and is made of plastic material. The object-side surface 131 and the image-side surface 132 of the third lens element 130 are aspheric.

The fourth lens element 140 with negative refractive power has a concave object-side surface 141 and a convex image-side surface 142, and is made of plastic material. The object-side surface 141 and the image-side surface 142 of the fourth lens element 140 are aspheric.

The fifth lens element 150 with positive refractive power has a convex object-side surface 151 and a concave image-side surface 152, and is made of plastic material. The object-side surface 151 and the image-side surface 152 of the fifth lens element 150 are aspheric. Furthermore, both of the object-side surface 151 and the image-side surface 152 of the fifth lens element 150 have at least one inflection point.

The sixth lens element 160 with negative refractive power has a concave object-side surface 161 and a concave image-side surface 162, and is made of plastic material. The object-side surface 161 and the image-side surface 162 of the sixth lens element 160 are aspheric. Furthermore, both of the object-side surface 161 and the image-side surface 162 of the sixth lens element 160 have at least one inflection point.

The IR-cut filter 180 is made of glass, and located between the sixth lens element 160 and the image plane 170, and will not affect the focal length of the optical image capturing system.

The equation of the aspheric surface profiles of the aforementioned lens elements of the 1st embodiment is expressed as follows:

$$X(Y) = (Y^2/R)/(1 + \text{sqrt}(1 - (1+k) \times (Y/R)^2)) + \sum_{i}(Ai) \times (Y^i),$$

Wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the optical image capturing system according to the 1st embodiment, when a focal length of the optical image capturing system is f, an f-number of the optical image capturing system is Fno, and half of the maximal field of view is HFOV, these parameters have the following values: f=3.80 mm; Fno=2.08; and HFOV=36.4 degrees.

In the optical image capturing system according to the 1st embodiment, when an Abbe number of the fourth lens element 140 is V4, and an Abbe number of the fifth lens element 150 is V5, the following relationship is satisfied: V4/V5=0.41.

In the optical image capturing system according to the 1st embodiment, when a central thickness of the third lens element 130 is CT3, and a central thickness of the fourth lens element 140 is CT4, the following relationship is satisfied: CT4/CT3=0.51.

In the optical image capturing system according to the 1st embodiment, when an axial distance between the fourth lens element 140 and the fifth lens element 150 is T45, and an axial distance between the fifth lens element 150 and the sixth lens element 160 is T56, the following relationship is satisfied: T45/T56=0.07.

In the optical image capturing system according to the 1st embodiment, when a curvature radius of the object-side surface 121 of the second lens element 120 is R3, a curvature radius of the image-side surface 122 of the second lens element 120 is R4, a curvature radius of the object-side surface 141 of the fourth lens element 140 is R7, a curvature radius of the image-side surface 142 of the fourth lens element 140 is R8, a curvature radius of the object-side surface 151 of the fifth lens element 150 is R9, a curvature radius of the image-side surface 152 of the fifth lens element 150 is R10, a curvature radius of the object-side surface 161 of the sixth lens element 160 is R11, and a curvature radius of the image-side surface 162 of the sixth lens element 160 is R12, the following relationships are satisfied: R9/|R10|=0.43; R11/R12=−0.34; (R3−R4)/(R3+R4)=0.25; and (R7−R8)/(R7+R8)=−0.18.

In the optical image capturing system according to the 1st embodiment, when a focal length of the first lens element 110 is f1, a focal length of the second lens element 120 is f2, a focal length of the fifth lens element 150 is f5, and a focal length of the sixth lens element 160 is f6, the following relationships are satisfied: f1/f5=0.74; and f6/f2=0.59.

Figure 21:
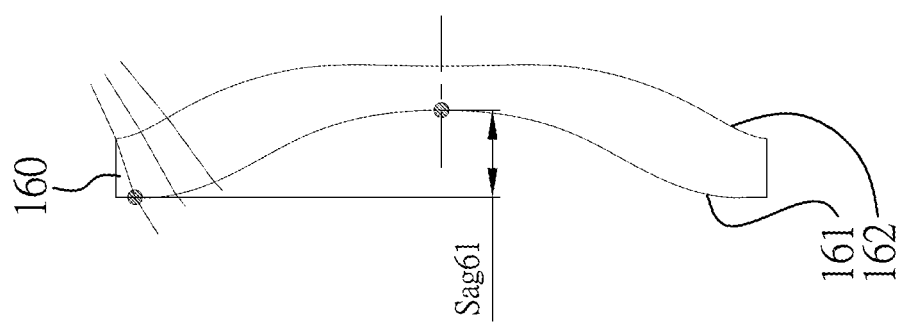
FIG. 21 shows Sag61 of the optical image capturing system according to FIG. 1.

FIG. 21 shows Sag61 of the sixth lens element 160 of the optical image capturing system according to FIG. 1. In the optical image capturing system according to the 1st embodiment, when a distance in parallel with an optical axis from an axial vertex on the object-side surface 161 of the sixth lens element 160 to a maximum effective diameter position on the object-side surface 161 of the sixth lens element 160 is Sag61 (When the distance towards the image side of the optical image capturing system is positive, and when the distance towards the object side of the optical image capturing system is negative), and a central thickness of the sixth lens element 160 is CT6, the following relationship is satisfied: Sag61/CT6=−1.98.

Figure 22:
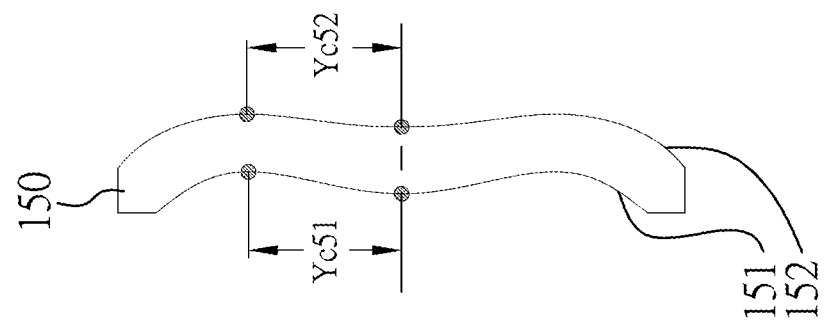
FIG. 22 shows Yc51 and Yc52 of the optical image capturing system according to FIG. 1.

FIG. 22 shows Yc51 and Yc52 of the fifth lens element 150 of the optical image capturing system according to FIG. 1. In the optical image capturing system according to the 1st embodiment, when a vertical distance between a non-axial critical point on the object-side surface 151 of the fifth lens element 150 and an optical axis is Yc51, and a vertical distance between a non-axial critical point on the image-side surface 152 of the fifth lens element 150 and the optical axis is Yc52, the following relationship is satisfied: Yc51/Yc52=0.99.

In the optical image capturing system according to the 1st embodiment, when an axial distance between the object-side surface 111 of the first lens element 110 and the image plane 170 is TL, and a maximum image height of the optical image capturing system is ImgH which here is half of the diagonal length of the effective photosensitive area of the image sensor 190 on the image plane 170, and the following relationship is satisfied: TL/ImgH=1.66.

The detailed optical data of the 1st embodiment are shown in Table 1 and the aspheric surface data are shown in Table 2 below.

TABLE 1

Embodiment 1
f = 3.80 mm, Fno = 2.08, HFOV = 36.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.308 | | | | |
| 2 | Lens 1 | 1.544 ASP | 0.521 | Plastic | 1.560 | 57.0 | 3.45 |
| 3 | | 6.768 ASP | 0.086 | | | | |
| 4 | Lens 2 | 2.655 ASP | 0.231 | Plastic | 1.639 | 23.5 | −6.97 |
| 5 | | 1.607 ASP | 0.350 | | | | |
| 6 | Lens 3 | −100.000 ASP | 0.651 | Plastic | 1.560 | 57.0 | 4.99 |
| 7 | | −2.722 ASP | 0.274 | | | | |
| 8 | Lens 4 | −0.844 ASP | 0.334 | Plastic | 1.639 | 23.5 | −6.57 |
| 9 | | −1.219 ASP | 0.040 | | | | |
| 10 | Lens 5 | 1.607 ASP | 0.456 | Plastic | 1.560 | 57.0 | 4.65 |
| 11 | | 3.767 ASP | 0.566 | | | | |
| 12 | Lens 6 | −2.984 ASP | 0.300 | Plastic | 1.535 | 55.7 | −4.14 |
| 13 | | 8.854 ASP | 0.300 | | | | |
| 14 | IR-cut filter | Plano | 0.210 | Glass | 1.517 | 64.2 | — |
| 15 | | Plano | 0.418 | | | | |
| 16 | Image | Plano | — | | | | |

Note:
Reference wavelength (d-line) is 587.6 nm.

TABLE 2

Aspheric Coefficients

| | Surface # | | | | | |
|---|---|---|---|---|---|---|
| | 2 | 3 | 4 | 5 | 6 | 7 |
| k= | 2.1401E−02 | 6.9538E+00 | −3.0000E+01 | −4.5836E+00 | −1.0000E+00 | 3.5871E+00 |
| A4= | 6.8318E−03 | −1.2529E−01 | −9.8015E−02 | −4.6191E−02 | −8.5616E−02 | −4.1870E−02 |
| A6= | 2.8743E−02 | 3.0413E−01 | 1.9953E−01 | 2.1559E−01 | 2.2194E−02 | 8.1512E−02 |
| A8= | −4.5130E−02 | −3.8453E−01 | −1.7897E−01 | −1.3114E−01 | −9.7451E−02 | −2.0117E−01 |
| A10= | 5.9783E−02 | 2.5598E−01 | 2.7044E−02 | 5.2874E−03 | 9.2340E−02 | 3.2118E−01 |
| A12= | −1.4434E−02 | −6.7606E−02 | −3.1241E−02 | 2.3484E−02 | −1.8980E−02 | −3.1994E−01 |
| A14= | 8.8853E−03 | −1.8534E−02 | 1.1327E−02 | 8.1069E−03 | 5.1793E−02 | 1.9621E−01 |
| A16= | −2.0347E−02 | −3.2119E−02 | −3.2528E−02 | 1.1692E−02 | −1.5479E−02 | −4.7365E−02 |

| | Surface # | | | | | |
|---|---|---|---|---|---|---|
| | 8 | 9 | 10 | 11 | 12 | 13 |
| k= | −3.3648E+00 | −9.6881E−01 | −1.2088E+01 | −5.8362E+00 | 3.6605E−01 | −1.0000E+00 |
| A4= | −7.7136E−03 | 9.5925E−02 | 4.3129E−02 | 3.4506E−02 | −8.5680E−03 | −8.3979E−02 |
| A6= | 3.3032E−02 | −1.4022E−02 | −1.7447E−01 | −1.4347E−01 | −7.9235E−02 | −1.3747E−02 |
| A8= | 1.3678E−02 | 2.4878E−02 | 1.5175E−01 | 1.0829E−01 | 7.6894E−02 | 3.1730E−02 |
| A10= | −4.9487E−03 | −6.3796E−03 | −8.1992E−02 | −4.6927E−02 | −2.8218E−02 | −1.4845E−02 |
| A12= | 2.3828E−04 | −5.5688E−04 | 2.4872E−02 | 1.2456E−02 | 5.2193E−03 | 3.2608E−03 |
| A14= | −6.5211E−04 | 6.7460E−05 | −3.7222E−03 | −1.8681E−03 | −4.7983E−04 | −3.4239E−04 |
| A16= | −3.3352E−04 | — | 2.1334E−04 | 1.1825E−04 | 1.7237E−05 | 1.3814E−05 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
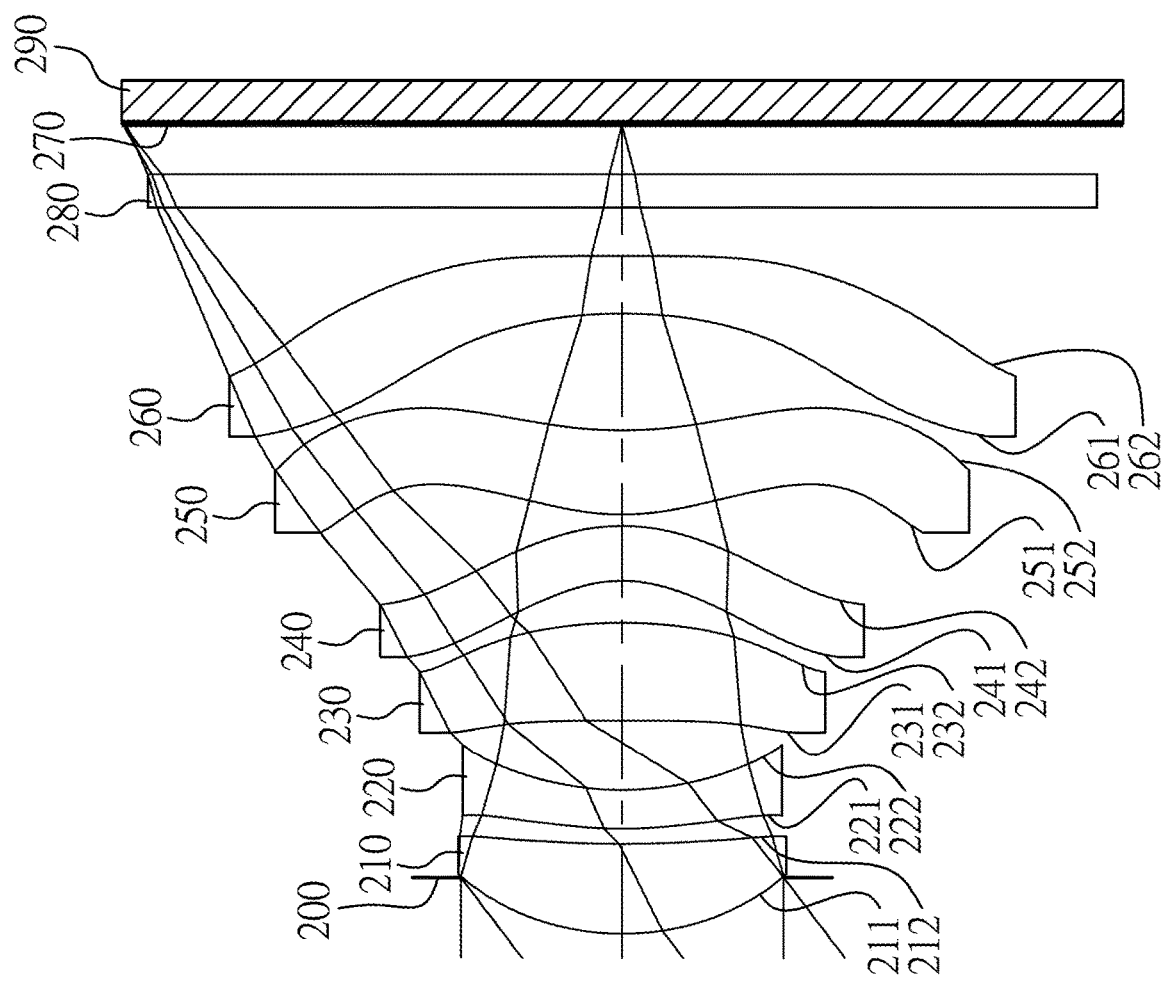
FIG. 3 is a schematic view of an optical image capturing system according to the 2nd embodiment of the present disclosure.
Figure 4:
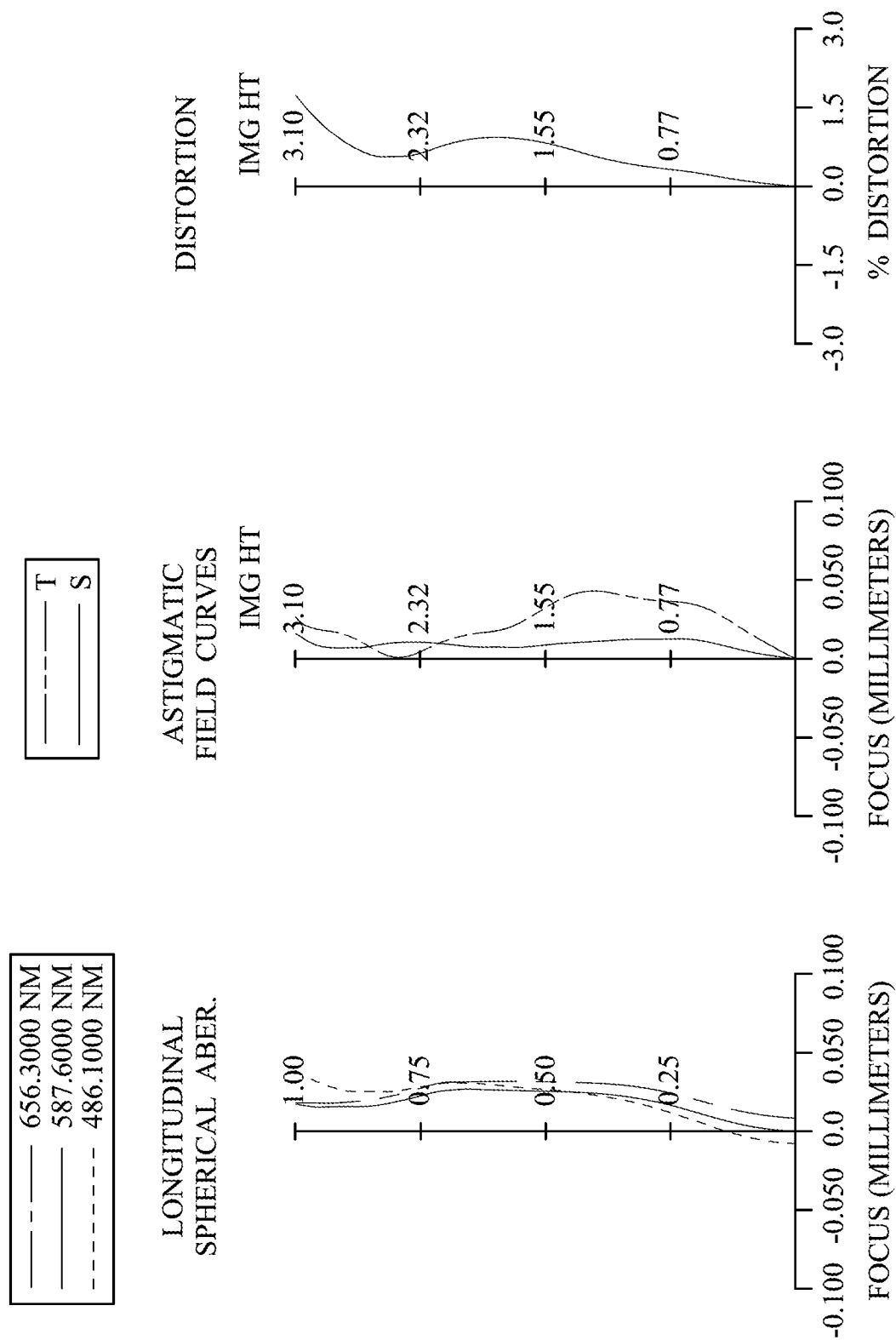
FIG. 4 shows spherical aberration curves, astigmatic field curves and a distortion curve of the optical image capturing system according to the 2nd embodiment.

FIG. 3 is a schematic view of an optical image capturing system according to the 2nd embodiment of the present disclosure. FIG. 4 shows spherical aberration curves, astigmatic field curves and a distortion curve of the optical image capturing system according to the 2nd embodiment. In FIG. 3, the optical image capturing system includes, in order from an object side to an image side, an aperture stop 200, a first lens element 210, a second lens element 220, a third lens element 230, a fourth lens element 240, a fifth lens element 250, a sixth lens element 260, an IR-cut filter 280, an image plane 270 and an image sensor 290.

The first lens element 210 with positive refractive power has a convex object-side surface 211 and a concave image-side surface 212, and is made of plastic material. The object-side surface 211 and the image-side surface 212 of the first lens element 210 are aspheric.

The second lens element 220 with negative refractive power has a convex object-side surface 221 and a concave image-side surface 222, and is made of plastic material. The object-side surface 221 and the image-side surface 222 of the second lens element 220 are aspheric.

The third lens element 230 with positive refractive power has a concave object-side surface 231 and a convex image-side surface 232, and is made of plastic material. The object-side surface 231 and the image-side surface 232 of the third lens element 230 are aspheric.

The fourth lens element 240 with negative refractive power has a concave object-side surface 241 and a convex image-side surface 242, and is made of plastic material. The object-side surface 241 and the image-side surface 242 of the fourth lens element 240 are aspheric.

The fifth lens element 250 with positive refractive power has a convex object-side surface 251 and a concave image-side surface 252, and is made of plastic material. The object-side surface 251 and the image-side surface 252 of the fifth lens element 250 are aspheric. Furthermore, both of the object-side surface 251 and the image-side surface 252 of the fifth lens element 250 have at least one inflection point.

The sixth lens element 260 with negative refractive power has a concave object-side surface 261 and a planar image-side surface 262, and is made of plastic material. The object-side surface 261 and the image-side surface 262 of the sixth lens element 260 are aspheric. Furthermore, both of the object-side surface 261 and the image-side surface 262 of the sixth lens element 260 have at least one inflection point.

The IR-cut filter 280 is made of glass, and located between the sixth lens element 260 and the image plane 270, and will not affect the focal length of the optical image capturing system.

The detailed optical data of the 2nd embodiment are shown in Table 3 and the aspheric surface data are shown in Table 4 below.

TABLE 3

Embodiment 2
f = 4.00 mm, Fno = 2.00, HFOV = 37.2 deg.

| Surface # | Length | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.349 | | | | |
| 2 | Lens 1 | 1.651 | ASP | 0.557 | Plastic | 1.560 | 57.0 | 3.87 |
| 3 | | 6.068 | ASP | 0.094 | | | | |
| 4 | Lens 2 | 2.675 | ASP | 0.240 | Plastic | 1.650 | 21.4 | −9.18 |
| 5 | | 1.782 | ASP | 0.433 | | | | |
| 6 | Lens 3 | −47.223 | ASP | 0.607 | Plastic | 1.560 | 57.0 | 5.78 |
| 7 | | −3.044 | ASP | 0.258 | | | | |
| 8 | Lens 4 | −0.900 | ASP | 0.341 | Plastic | 1.650 | 21.4 | −7.73 |
| 9 | | −1.260 | ASP | 0.072 | | | | |
| 10 | Lens 5 | 1.610 | ASP | 0.525 | Plastic | 1.540 | 55.7 | 6.02 |
| 11 | | 2.828 | ASP | 0.722 | | | | |
| 12 | Lens 6 | −3.005 | ASP | 0.357 | Plastic | 1.535 | 55.7 | −5.62 |
| 13 | | ∞ | ASP | 0.300 | | | | |
| 14 | IR-cut filter | Plano | | 0.210 | Glass | 1.517 | 64.2 | — |
| 15 | | Plano | | 0.314 | | | | |
| 16 | Image | Plano | | — | | | | |

Note:
Reference wavelength (d-line) is 587.6 nm.

TABLE 4

Aspheric Coefficients

| Surface # | | | | | |
|---|---|---|---|---|---|
| 2 | 3 | 4 | 5 | 6 | 7 |
| k= 1.4780E−02 | −1.8011E−01 | −2.2245E+01 | −4.2620E+00 | −1.0000E+00 | 3.5434E+00 |
| A4= 4.9032E−03 | −1.0175E−01 | −7.4047E−02 | −3.3117E−02 | −6.5950E−02 | −3.6315E−02 |
| A6= 1.9082E−02 | 2.0139E−01 | 1.3186E−01 | 1.4540E−01 | 1.4560E−02 | 5.4096E−02 |
| A8= −2.5452E−02 | −2.1625E−01 | −1.0099E−01 | −7.3640E−02 | −5.4002E−02 | −1.1264E−01 |
| A10= 2.8506E−02 | 1.2282E−01 | 1.3265E−02 | 2.2921E−03 | 4.5422E−02 | 1.5390E−01 |
| A12= −5.9130E−03 | −2.6713E−02 | −1.1533E−02 | 9.4330E−03 | −7.3593E−03 | −1.2971E−01 |
| A14= 2.9778E−03 | −5.8898E−03 | 4.8910E−03 | 3.2469E−03 | 1.6849E−02 | 6.7685E−02 |
| A16= −5.9196E−03 | −8.6464E−03 | −8.1272E−03 | 4.3347E−03 | −6.5680E−03 | −1.3784E−02 |

| Surface # | | | | | |
|---|---|---|---|---|---|
| 8 | 9 | 10 | 11 | 12 | 13 |
| k= −2.9319E+00 | −9.5381E−01 | −9.4558E+00 | −8.5296E+00 | 3.4266E−01 | −1.0000E+00 |
| A4= −3.3635E−03 | 7.4211E−02 | 3.2637E−02 | 2.9932E−02 | −6.1474E−03 | −5.7897E−02 |
| A6= 2.2015E−02 | −9.5414E−03 | −1.1573E−01 | −9.5419E−02 | −5.2448E−02 | −9.4793E−03 |
| A8= 7.5854E−03 | 1.3940E−02 | 8.5548E−02 | 6.0866E−02 | 4.3316E−02 | 1.7843E−02 |
| A10= −2.4113E−03 | −3.0872E−03 | −3.9192E−02 | −2.2437E−02 | −1.3493E−02 | −7.1019E−03 |
| A12= 1.0288E−04 | −2.4530E−04 | 1.0096E−02 | 5.0587E−03 | 2.1182E−03 | 1.3230E−03 |
| A14= −1.9964E−04 | 1.5397E−05 | −1.2821E−03 | −6.4268E−04 | −1.6528E−04 | −1.1798E−04 |
| A16= −7.2350E−05 | — | 6.2221E−05 | 3.4710E−05 | 5.0430E−06 | 4.0365E−06 |

In the optical image capturing system according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following relationships:

| f [mm] | 4.00 | (R3 − R4)/(R3 + R4) | 0.20 |
|---|---|---|---|
| Fno | 2.00 | (R7 − R8)/(R7 + R8) | −0.17 |
| HFOV [deg.] | 37.2 | f1/f5 | 0.64 |
| V4/V5 | 0.38 | f6/f2 | 0.61 |
| CT4/CT3 | 0.56 | Sag61/CT6 | −2.13 |
| T45/T56 | 0.10 | Yc51/Yc52 | 0.96 |
| R9/|R10| | 0.57 | TL/ImgH | 1.62 |
| R11/R12 | 0.00 | | |

3rd Embodiment

Figure 5:
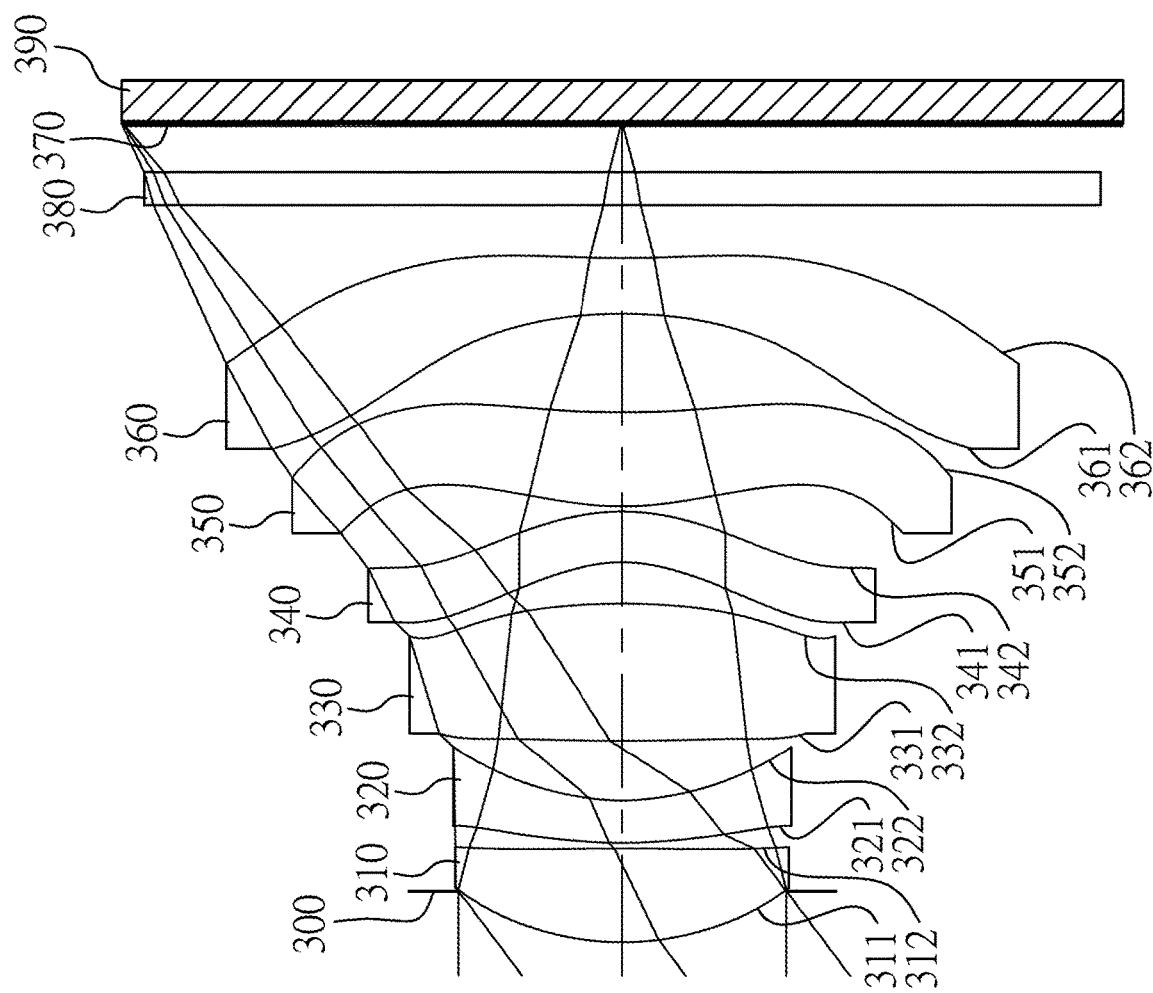
FIG. 5 is a schematic view of an optical image capturing system according to the 3rd embodiment of the present disclosure.
Figure 6:
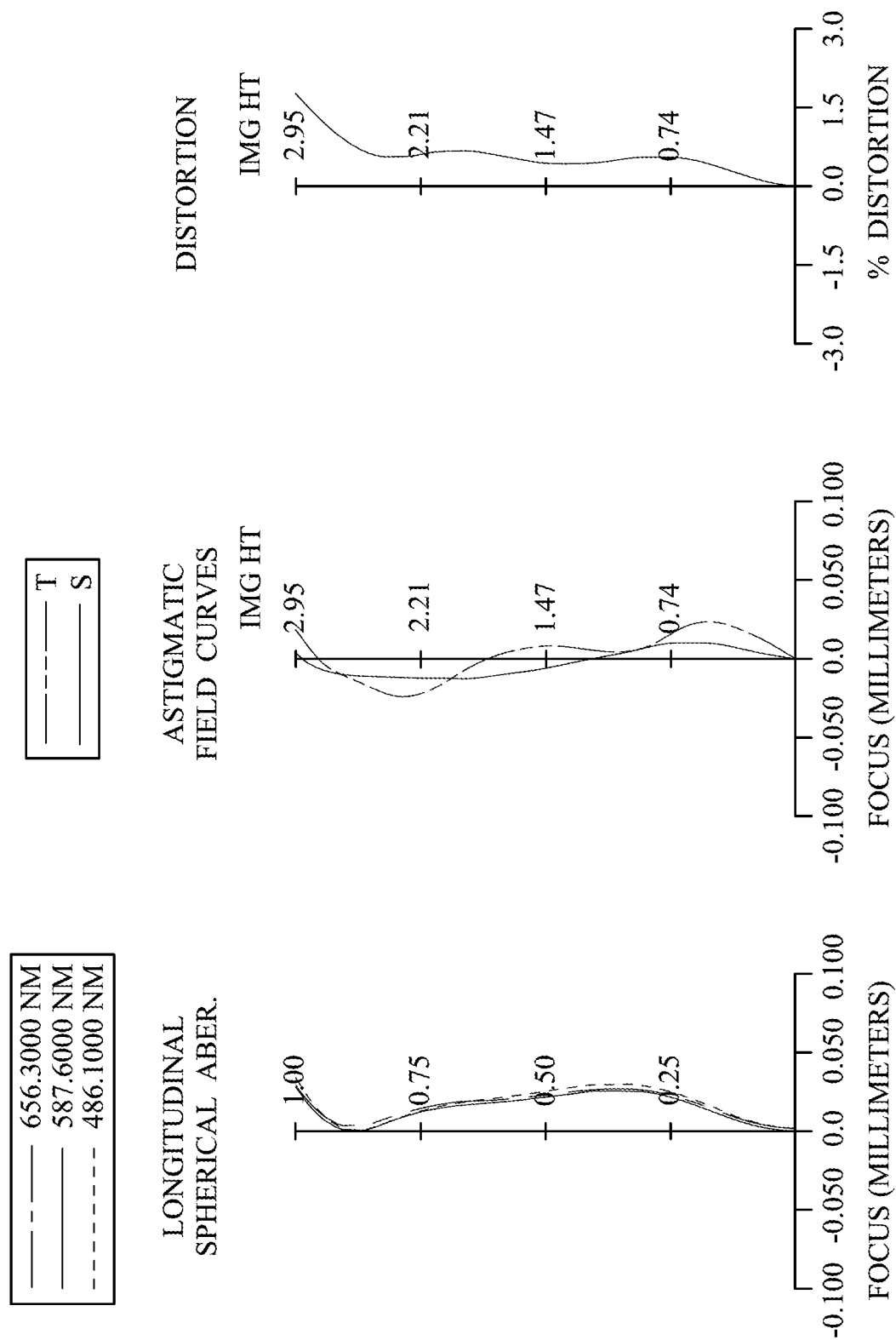
FIG. 6 shows spherical aberration curves, astigmatic field curves and a distortion curve of the optical image capturing system according to the 3rd embodiment.

FIG. 5 is a schematic view of an optical image capturing system according to the 3rd embodiment of the present disclosure. FIG. 6 shows spherical aberration curves, astigmatic field curves and a distortion curve of the optical image capturing system according to the 3rd embodiment. In FIG. 5, the optical image capturing system includes, in order from an object side to an image side, an aperture stop 300, a first lens element 310, a second lens element 320, a third lens element 330, a fourth lens element 340, a fifth lens element 350, a sixth lens element 360, an IR-cut filter 380, an image plane 370 and an image sensor 390.

The first lens element 310 with positive refractive power has a convex object-side surface 311 and a convex image-side surface 312, and is made of plastic material. The object-side surface 311 and the image-side surface 312 of the first lens element 310 are aspheric.

The second lens element 320 with negative refractive power has a convex object-side surface 321 and a concave image-side surface 322, and is made of plastic material. The object-side surface 321 and the image-side surface 322 of the second lens element 320 are aspheric.

The third lens element 330 with positive refractive power has a convex object-side surface 331 and a convex image-side surface 332, and is made of plastic material. The object-side surface 331 and the image-side surface 332 of the third lens element 330 are aspheric.

The fourth lens element 340 with negative refractive power has a concave object-side surface 341 and a convex image-side surface 342, and is made of plastic material. The object-side surface 341 and the image-side surface 342 of the fourth lens element 340 are aspheric.

The fifth lens element 350 with positive refractive power has a convex object-side surface 351 and a concave image-side surface 352, and is made of plastic material. The object-side surface 351 and the image-side surface 352 of the fifth lens element 350 are aspheric. Furthermore, both of the object-side surface 351 and the image-side surface 352 of the fifth lens element 350 have at least one inflection point.

The sixth lens element 360 with negative refractive power has a concave object-side surface 361 and a concave image-side surface 362, and is made of plastic material. The object-side surface 361 and the image-side surface 362 of the sixth lens element 360 are aspheric. Furthermore, both of the object-side surface 361 and the image-side surface 362 of the sixth lens element 360 have at least one inflection point.

The IR-cut filter 380 is made of glass, and located between the sixth lens element 360 and the image plane 370, and will not affect the focal length of the optical image capturing system.

The detailed optical data of the 3rd embodiment are shown in Table 5 and the aspheric surface data are shown in Table 6 below.

TABLE 5

Embodiment 3
f = 3.83 mm, Fno = 1.98, HFOV = 37.0 deg.

| Surface # | Length | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.301 | | | | |
| 2 | Lens 1 | 1.744 | ASP | 0.552 | Plastic | 1.550 | 56.5 | 3.02 |
| 3 | | −30.797 | ASP | 0.034 | | | | |
| 4 | Lens 2 | 2.705 | ASP | 0.249 | Plastic | 1.640 | 23.3 | −4.77 |
| 5 | | 1.382 | ASP | 0.356 | | | | |
| 6 | Lens 3 | 10.917 | ASP | 0.811 | Plastic | 1.544 | 55.9 | 5.56 |
| 7 | | −4.076 | ASP | 0.244 | | | | |
| 8 | Lens 4 | −0.957 | ASP | 0.300 | Plastic | 1.640 | 23.3 | −8.32 |
| 9 | | −1.309 | ASP | 0.030 | | | | |
| 10 | Lens 5 | 1.863 | ASP | 0.560 | Plastic | 1.535 | 55.7 | 4.82 |
| 11 | | 6.002 | ASP | 0.580 | | | | |
| 12 | Lens 6 | −2.800 | ASP | 0.330 | Plastic | 1.535 | 55.7 | −3.74 |
| 13 | | 7.304 | ASP | 0.310 | | | | |
| 14 | IR-cut filter | Plano | | 0.200 | Glass | 1.517 | 64.2 | — |
| 15 | | Plano | | 0.287 | | | | |
| 16 | Image | Plano | | — | | | | |

Note:
Reference wavelength (d-line) is 587.6 nm.

TABLE 6

Aspheric Coefficients

| Surface # | | | | | | |
|---|---|---|---|---|---|---|
| | 2 | 3 | 4 | 5 | 6 | 7 |
| k= | −1.2471E−02 | −2.3925E+01 | −2.9977E+01 | −4.0376E+00 | −1.0000E+00 | 2.3097E+00 |
| A4= | 1.0626E−02 | −3.3713E−02 | −5.4545E−02 | −5.1317E−02 | −5.3871E−02 | −4.8779E−02 |
| A6= | 1.1386E−02 | 2.2789E−01 | 1.7714E−01 | 1.8152E−01 | 3.4529E−02 | 5.5212E−02 |
| A8= | −3.1769E−02 | −3.1487E−01 | −1.6050E−01 | −1.0567E−01 | −6.9181E−02 | −1.5288E−01 |
| A10= | 4.6249E−02 | 1.9647E−01 | 2.2227E−02 | −1.9214E−03 | 6.9946E−02 | 2.4156E−01 |
| A12= | −1.6040E−02 | −3.9034E−02 | −6.9860E−03 | 1.4849E−02 | −1.0471E−02 | −2.2763E−01 |
| A14= | 2.3826E−03 | −2.7248E−03 | 1.9573E−02 | 8.2846E−03 | 2.2821E−02 | 1.2623E−01 |
| A16= | −2.8870E−03 | −8.6929E−03 | −1.1558E−02 | −1.7637E−03 | −1.6101E−02 | −2.7400E−02 |

TABLE 6-continued

Aspheric Coefficients

| Surface # | | | | | |
|---|---|---|---|---|---|
| 8 | 9 | 10 | 11 | 12 | 13 |
| k= −3.7292E+00 | −1.1747E+00 | −1.6218E+01 | −2.1825E−01 | 4.7677E−01 | 2.3516E+00 |
| A4= 1.3960E−02 | 9.5637E−02 | 3.1677E−02 | 2.5805E−02 | −1.3284E−02 | −8.2708E−02 |
| A6= 1.9242E−02 | −1.0437E−02 | −1.3835E−01 | −1.2044E−01 | −6.7111E−02 | −9.9192E−03 |
| A8= 5.7350E−03 | 1.9017E−02 | 1.1872E−01 | 8.6616E−02 | 6.1454E−02 | 2.5314E−02 |
| A10= −3.0372E−03 | −5.4765E−03 | −6.1655E−02 | −3.5345E−02 | −2.1059E−02 | −1.1139E−02 |
| A12= 1.4568E−03 | −7.8247E−04 | 1.7418E−02 | 8.7053E−03 | 3.6592E−03 | 2.2758E−03 |
| A14= 1.0933E−03 | 1.4187E−04 | −2.4339E−03 | −1.2189E−03 | −3.1494E−04 | −2.2500E−04 |
| A16= −8.6740E−04 | — | 1.3175E−04 | 7.3565E−05 | 1.0517E−05 | 8.6751E−06 |

In the optical image capturing system according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following relationships:

| f [mm] | 3.83 | (R3 − R4)/(R3 + R4) | 0.32 |
|---|---|---|---|
| Fno | 1.98 | (R7 − R8)/(R7 + R8) | −0.16 |
| HFOV [deg.] | 37.0 | f1/f5 | 0.63 |
| V4/V5 | 0.42 | f6/f2 | 0.78 |
| CT4/CT3 | 0.37 | Sag61/CT6 | −2.42 |
| T45/T56 | 0.05 | Yc51/Yc52 | 1.09 |
| R9/|R10| | 0.31 | TL/ImgH | 1.64 |
| R11/R12 | −0.38 | | |

4th Embodiment

Figure 7:
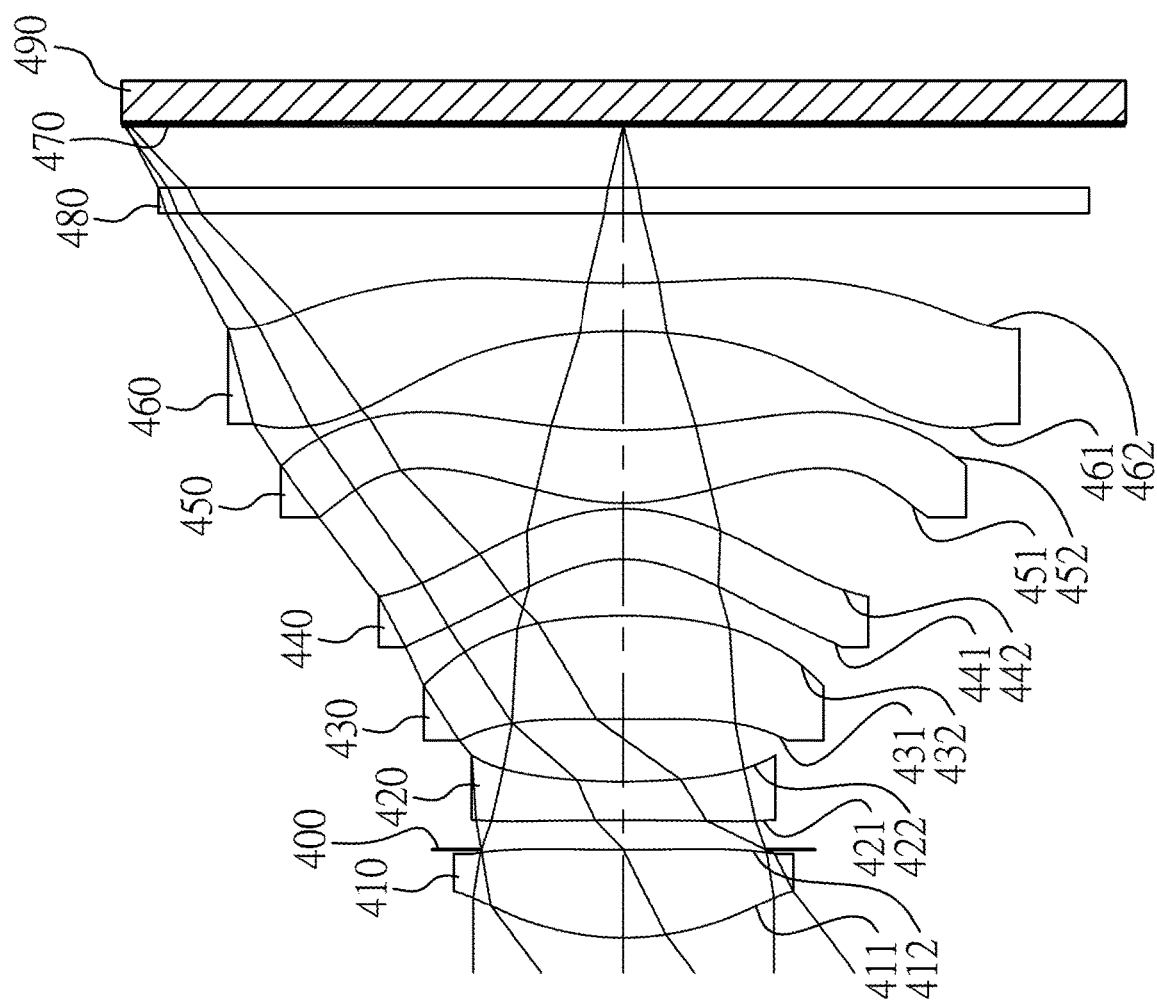
FIG. 7 is a schematic view of an optical image capturing system according to the 4th embodiment of the present disclosure.
Figure 8:
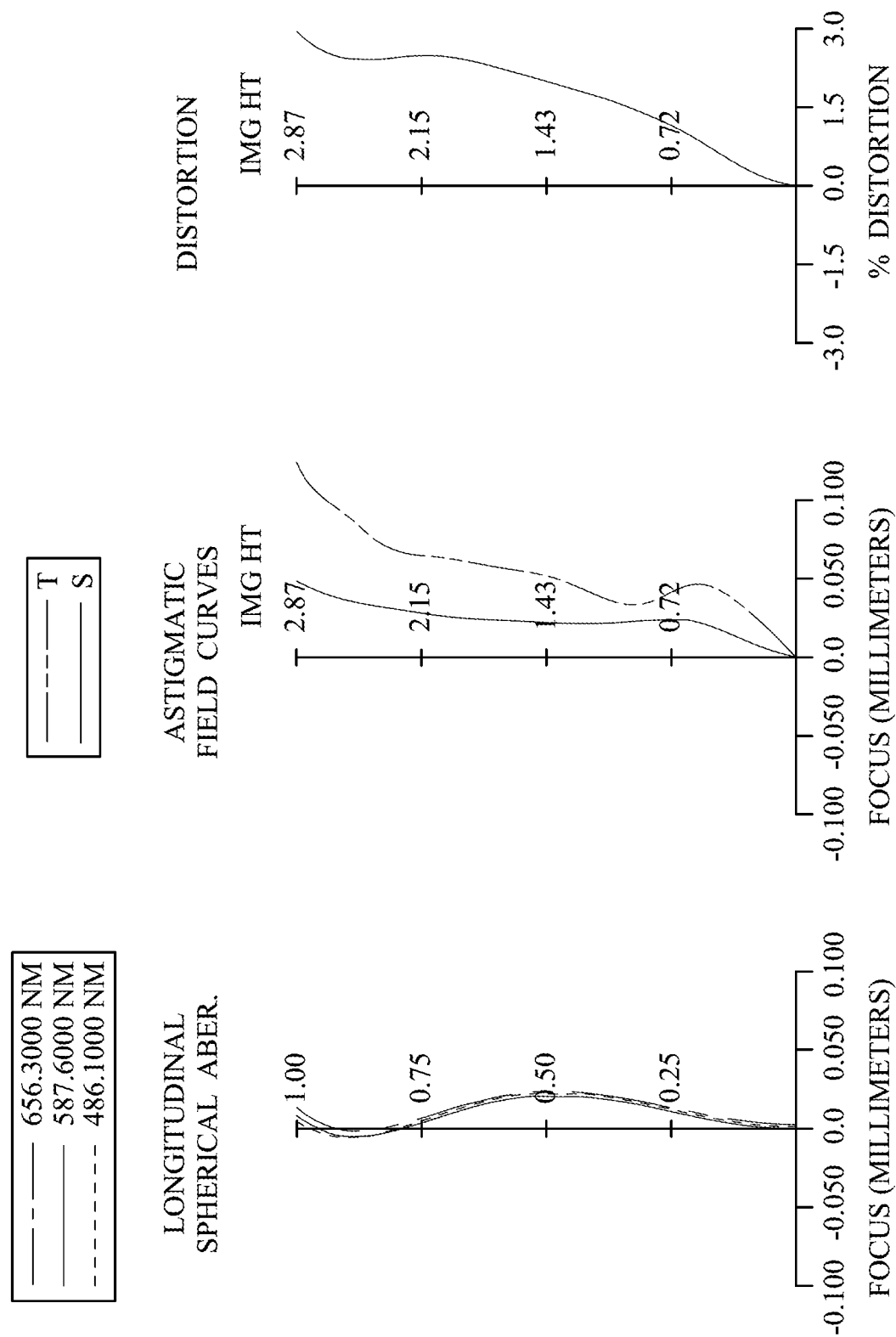
FIG. 8 shows spherical aberration curves, astigmatic field curves and a distortion curve of the optical image capturing system according to the 4th embodiment.

FIG. 7 is a schematic view of an optical image capturing system according to the 4th embodiment of the present disclosure. FIG. 8 shows spherical aberration curves, astigmatic field curves and a distortion curve of the optical image capturing system according to the 4th embodiment. In FIG. 7, the optical image capturing system includes, in order from an object side to an image side, a first lens element 410, an aperture stop 400, a second lens element 420, a third lens element 430, a fourth lens element 440, a fifth lens element 450, a sixth lens element 460, an IR-cut filter 480, an image plane 470 and an image sensor 490.

The first lens element 410 with positive refractive power has a convex object-side surface 411 and a concave image-side surface 412, and is made of plastic material. The object-side surface 411 and the image-side surface 412 of the first lens element 410 are aspheric.

The second lens element 420 with negative refractive power has a concave object-side surface 421 and a concave image-side surface 422, and is made of plastic material. The object-side surface 421 and the image-side surface 422 of the second lens element 420 are aspheric.

The third lens element 430 with positive refractive power has a convex object-side surface 431 and a convex image-side surface 432, and is made of plastic material. The object-side surface 431 and the image-side surface 432 of the third lens element 430 are aspheric.

The fourth lens element 440 with negative refractive power has a concave object-side surface 441 and a convex image-side surface 442, and is made of plastic material. The object-side surface 441 and the image-side surface 442 of the fourth lens element 440 are aspheric.

The fifth lens element 450 with positive refractive power has a convex object-side surface 451 and a concave image-side surface 452, and is made of plastic material. The object-side surface 451 and the image-side surface 452 of the fifth lens element 450 are aspheric. Furthermore, both of the object-side surface 451 and the image-side surface 452 of the fifth lens element 450 have at least one inflection point.

The sixth lens element 460 with negative refractive power has a concave object-side surface 461 and a concave image-side surface 462, and is made of plastic material. The object-side surface 461 and the image-side surface 462 of the sixth lens element 460 are aspheric. Furthermore, both of the object-side surface 461 and the image-side surface 462 of the sixth lens element 460 have at least one inflection point.

The IR-cut filter 480 is made of glass, and located between the sixth lens element 460 and the image plane 470, and will not affect the focal length of the optical image capturing system.

The detailed optical data of the 4th embodiment are shown in Table 7 and the aspheric surface data are shown in Table 8 below.

TABLE 7

Embodiment 4
f = 3.71 mm, Fno = 2.15, HFOV = 36.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.604 | ASP | 0.509 | Plastic | 1.553 | 56.5 | 3.12 |
| 2 | | 20.208 | ASP | 0.000 | | | | |
| 3 | Ape. Stop | Plano | | 0.168 | | | | |
| 4 | Lens 2 | −98.770 | ASP | 0.220 | Plastic | 1.634 | 23.8 | −5.48 |
| 5 | | 3.604 | ASP | 0.359 | | | | |
| 6 | Lens 3 | 154.876 | ASP | 0.594 | Plastic | 1.553 | 56.5 | 5.22 |

TABLE 7-continued

Embodiment 4
f = 3.71 mm, Fno = 2.15, HFOV = 36.9 deg.

| Surface # | | Curvature Radius | Thickness | Material | Index | Abbe # | Focal Length |
|---|---|---|---|---|---|---|---|
| 7 | | −2.938 ASP | 0.326 | | | | |
| 8 | Lens 4 | −0.755 ASP | 0.288 | Plastic | 1.634 | 23.8 | −4.94 |
| 9 | | −1.142 ASP | 0.033 | | | | |
| 10 | Lens 5 | 1.298 ASP | 0.419 | Plastic | 1.553 | 56.5 | 3.34 |
| 11 | | 3.873 ASP | 0.566 | | | | |
| 12 | Lens 6 | −3.146 ASP | 0.280 | Plastic | 1.553 | 56.5 | −3.65 |
| 13 | | 5.794 ASP | 0.400 | | | | |
| 14 | IR-cut filter | Plano | 0.145 | Glass | 1.517 | 64.2 | — |
| 15 | | Plano | 0.365 | | | | |
| 16 | Image | Plano | — | | | | |

Note:
Reference wavelength (d-line) is 587.6 nm.

TABLE 8

Aspheric Coefficients

Surface #

| | 1 | 2 | 4 | 5 | 6 | 7 |
|---|---|---|---|---|---|---|
| k= | −2.2864E−01 | −1.0000E+00 | −1.0000E+00 | −5.0497E+00 | −1.0000E+00 | 4.3178E+00 |
| A4= | −4.5632E−03 | −7.7685E−02 | −9.4644E−02 | −3.2767E−02 | −1.3250E−01 | −5.5495E−02 |
| A6= | 1.2839E−02 | 9.7848E−02 | 2.3666E−01 | 2.0850E−01 | −1.1137E−02 | 3.6450E−02 |
| A8= | −5.8135E−02 | −2.4352E−01 | −1.5273E−01 | −9.1680E−02 | −8.1290E−02 | −1.5050E−01 |
| A10= | 2.6092E−02 | 2.5818E−01 | −2.1242E−02 | −1.7698E−02 | 4.7686E−02 | 2.1189E−01 |
| A12= | −2.4451E−02 | −6.9618E−01 | 1.7184E−01 | 6.7782E−02 | −2.3688E−02 | −1.8264E−01 |
| A14= | 1.0371E−02 | −1.8694E−01 | −1.6488E−01 | 7.6518E−02 | 5.8306E−03 | 1.0221E−01 |
| A16= | −2.9228E−02 | 1.2812E−01 | 6.8948E−02 | −8.1474E−02 | 5.7300E−02 | −2.3803E−02 |

Surface #

| | 8 | 9 | 10 | 11 | 12 | 13 |
|---|---|---|---|---|---|---|
| k= | −3.5890E+00 | −1.0059E+00 | −1.0269E+01 | 2.7438E−01 | 1.5879E−01 | −1.0000E+00 |
| A4= | −2.9925E−02 | 8.6051E−02 | 4.7462E−02 | 2.9842E−02 | −9.9905E−03 | −6.5067E−02 |
| A6= | 2.6697E−02 | −1.1610E−02 | −1.4026E−02 | −1.1828E−01 | −6.0728E−02 | −1.3044E−02 |
| A8= | 1.1360E−02 | 1.7268E−02 | 1.0694E−01 | 7.7700E−02 | 5.4539E−02 | 2.2690E−02 |
| A10= | −2.3315E−03 | −4.4581E−03 | −5.2631E−02 | −3.0156E−02 | −1.8125E−02 | −9.5138E−03 |
| A12= | 3.4301E−04 | −4.3650E−04 | 1.4500E−02 | 7.2452E−03 | 3.0389E−03 | 1.8982E−03 |
| A14= | −7.2590E−04 | 7.9665E−05 | −1.9555E−03 | −9.8547E−04 | −2.5353E−04 | −1.8077E−04 |
| A16= | −8.9418E−04 | — | 1.0293E−04 | 5.7138E−05 | 8.1499E−06 | 6.5793E−06 |

In the optical image capturing system according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following relationships:

| f [mm] | 3.71 | (R3 − R4)/(R3 + R4) | 1.08 |
|---|---|---|---|
| Fno | 2.15 | (R7 − R8)/(R7 + R8) | −0.20 |
| HFOV [deg.] | 36.9 | f1/f5 | 0.93 |
| V4/V5 | 0.42 | f6/f2 | 0.67 |
| CT4/CT3 | 0.48 | Sag61/CT6 | −1.90 |
| T45/T56 | 0.06 | Yc51/Yc52 | 1.00 |
| R9/|R10| | 0.34 | TL/ImgH | 1.63 |
| R11/R12 | −0.54 | | |

5th Embodiment

Figure 9:
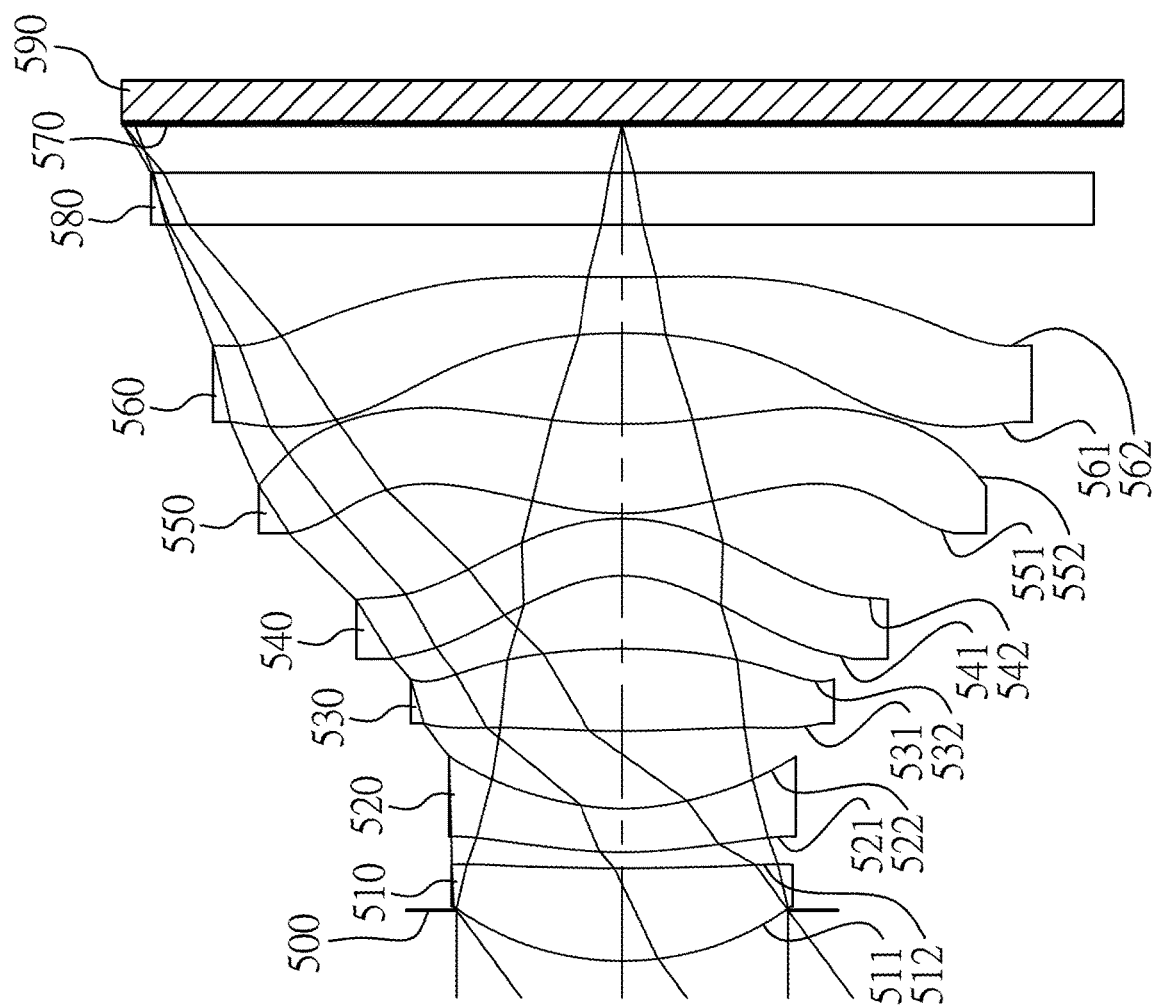
FIG. 9 is a schematic view of an optical image capturing system according to the 5th embodiment of the present disclosure.
Figure 10:
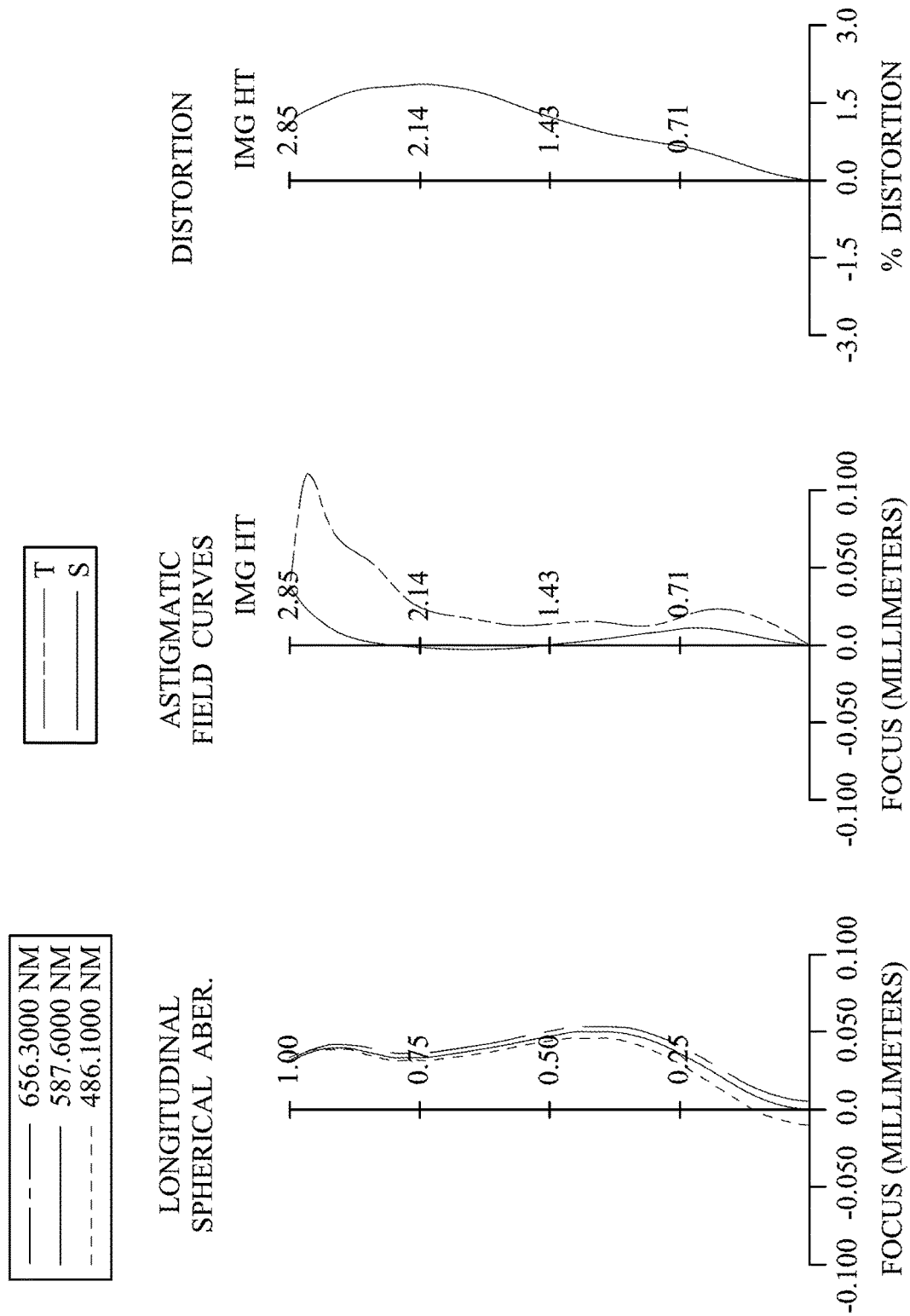
FIG. 10 shows spherical aberration curves, astigmatic field curves and a distortion curve of the optical image capturing system according to the 5th embodiment.

FIG. 9 is a schematic view of an optical image capturing system according to the 5th embodiment of the present disclosure. FIG. 10 shows spherical aberration curves, astigmatic field curves and a distortion curve of the optical image capturing system according to the 5th embodiment. In FIG. 9, the optical image capturing system includes, in order from an object side to an image side, an aperture stop 500, a first lens element 510, a second lens element 520, a third lens element 530, a fourth lens element 540, a fifth lens element 550, a sixth lens element 560, an IR-cut filter 580, an image plane 570 and an image sensor 590.

The first lens element 510 with positive refractive power has a convex object-side surface 511 and a concave image-side surface 512, and is made of plastic material. The object-side surface 511 and the image-side surface 512 of the first lens element 510 are aspheric.

The second lens element 520 with negative refractive power has a convex object-side surface 521 and a concave image-side surface 522, and is made of plastic material. The object-side surface 521 and the image-side surface 522 of the second lens element 520 are aspheric.

The third lens element 530 with positive refractive power has a convex object-side surface 531 and a convex image-side surface 532, and is made of plastic material. The object-side surface 531 and the image-side surface 532 of the third lens element 530 are aspheric.

The fourth lens element 540 with negative refractive power has a concave object-side surface 541 and a convex image-side surface 542, and is made of plastic material. The object-side surface 541 and the image-side surface 542 of the fourth lens element 540 are aspheric.

The fifth lens element 550 with positive refractive power has a convex object-side surface 551 and a concave image-side surface 552, and is made of plastic material. The object-side surface 551 and the image-side surface 552 of the fifth lens element 550 are aspheric. Furthermore, both of the object-side surface 551 and the image-side surface 552 of the fifth lens element 550 have at least one inflection point.

The sixth lens element 560 with negative refractive power has a concave object-side surface 561 and a concave image-side surface 562, and is made of plastic material. The object-side surface 561 and the image-side surface 562 of the sixth lens element 560 are aspheric. Furthermore, both of the object-side surface 561 and the image-side surface 562 of the sixth lens element 560 have at least one inflection point.

The IR-cut filter 580 is made of glass, and located between the sixth lens element 560 and the image plane 570, and will not affect the focal length of the optical image capturing system.

The detailed optical data of the 5th embodiment are shown in Table 9 and the aspheric surface data are shown in Table 10 below.

TABLE 9

Embodiment 5
f = 3.79 mm, Fno = 2.00, HFOV = 36.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.290 | | | | |
| 2 | Lens 1 | 1.661 | ASP | 0.530 | Plastic | 1.544 | 55.9 | 3.61 |
| 3 | | 9.488 | ASP | 0.091 | | | | |
| 4 | Lens 2 | 2.395 | ASP | 0.250 | Plastic | 1.640 | 23.3 | −6.36 |
| 5 | | 1.446 | ASP | 0.448 | | | | |
| 6 | Lens 3 | 7.570 | ASP | 0.469 | Plastic | 1.544 | 55.9 | 4.70 |
| 7 | | −3.783 | ASP | 0.416 | | | | |
| 8 | Lens 4 | −0.783 | ASP | 0.327 | Plastic | 1.640 | 23.3 | −6.79 |
| 9 | | −1.111 | ASP | 0.030 | | | | |
| 10 | Lens 5 | 1.582 | ASP | 0.513 | Plastic | 1.544 | 55.9 | 4.67 |
| 11 | | 3.715 | ASP | 0.520 | | | | |
| 12 | Lens 6 | −2.783 | ASP | 0.320 | Plastic | 1.535 | 55.7 | −4.49 |
| 13 | | 18.229 | ASP | 0.300 | | | | |
| 14 | IR-cut filter | Plano | | 0.300 | Glass | 1.517 | 64.2 | — |
| 15 | | Plano | | 0.279 | | | | |
| 16 | Image | Plano | | — | | | | |

Note:
Reference wavelength (d-line) is 587.6 nm.

TABLE 10

Aspheric Coefficients

| Surface # | | | | | |
|---|---|---|---|---|---|
| 2 | 3 | 4 | 5 | 6 | 7 |
| k= −1.1848E−01 | 4.0101E+01 | −2.5829E+01 | −4.4683E+00 | 1.6709E+01 | 4.4698E+00 |
| A4= −1.5217E−03 | −1.2665E−01 | −9.1181E−02 | −5.4365E−02 | −6.2951E−02 | −3.7903E−02 |
| A6= 3.2135E−02 | 3.0414E−01 | 2.0535E−01 | 1.9652E−01 | 2.1528E−02 | 7.8415E−02 |
| A8= −4.6992E−02 | −3.7046E−01 | −1.8078E−01 | −1.3093E−01 | −9.1208E−02 | −2.0520E−01 |
| A10= 5.1022E−02 | 2.3379E−01 | 3.2837E−02 | 1.4682E−02 | 9.2006E−02 | 3.2023E−01 |
| A12= −2.4081E−02 | −8.4477E−02 | −5.5264E−03 | 2.2145E−02 | −2.7971E−02 | −3.1904E−01 |
| A14= −2.0016E−03 | 5.9927E−04 | 2.4583E−03 | −5.9433E−03 | 3.7774E−02 | 1.9692E−01 |
| A16= −7.0639E−04 | −1.1309E−05 | 1.3719E−09 | −3.6045E−10 | −2.1810E−02 | −4.8110E−02 |

| Surface # | | | | | |
|---|---|---|---|---|---|
| 8 | 9 | 10 | 11 | 12 | 13 |
| k= −2.8741E+00 | −1.0053E+00 | −1.1436E+01 | −5.1510E+00 | 1.7391E−01 | 7.0381E−01 |
| A4= −4.3638E−03 | 9.7826E−02 | 5.1284E−02 | 3.7167E−02 | 1.4839E−03 | −7.1133E−02 |
| A6= 3.6416E−02 | −1.4420E−02 | −1.7255E−01 | −1.4244E−01 | −7.9218E−02 | −1.3458E−02 |
| A8= 1.3866E−02 | 2.5114E−02 | 1.5201E−01 | 1.0769E−01 | 7.6806E−02 | 3.1633E−02 |
| A10= −6.0749E−03 | −6.2422E−03 | −8.2056E−02 | −4.6802E−02 | −2.8230E−02 | −1.4855E−02 |
| A12= −5.4360E−04 | −5.2653E−04 | 2.4838E−02 | 1.2460E−02 | 5.2176E−03 | 3.2609E−03 |
| A14= −7.8736E−04 | 1.1945E−05 | −3.7282E−03 | −1.8686E−03 | −4.7994E−04 | −3.4244E−04 |
| A16= −4.7704E−07 | — | 2.1448E−04 | 1.1843E−04 | 1.7270E−05 | 1.3777E−05 |

In the optical image capturing system according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following relationships:

| f [mm] | 3.79 | (R3 − R4)/(R3 + R4) | 0.25 |
|---|---|---|---|
| Fno | 2.00 | (R7 − R8)/(R7 + R8) | −0.17 |
| HFOV [deg.] | 36.5 | f1/f5 | 0.77 |

-continued

| | | | |
|---|---|---|---|
| V4/V5 | 0.42 | f6/f2 | 0.71 |
| CT4/CT3 | 0.70 | Sag61/CT6 | -1.59 |
| T45/T56 | 0.06 | Yc51/Yc52 | 1.01 |
| R9/|R10| | 0.43 | TL/ImgH | 1.68 |
| R11/R12 | -0.15 | | |

6th Embodiment

Figure 11:
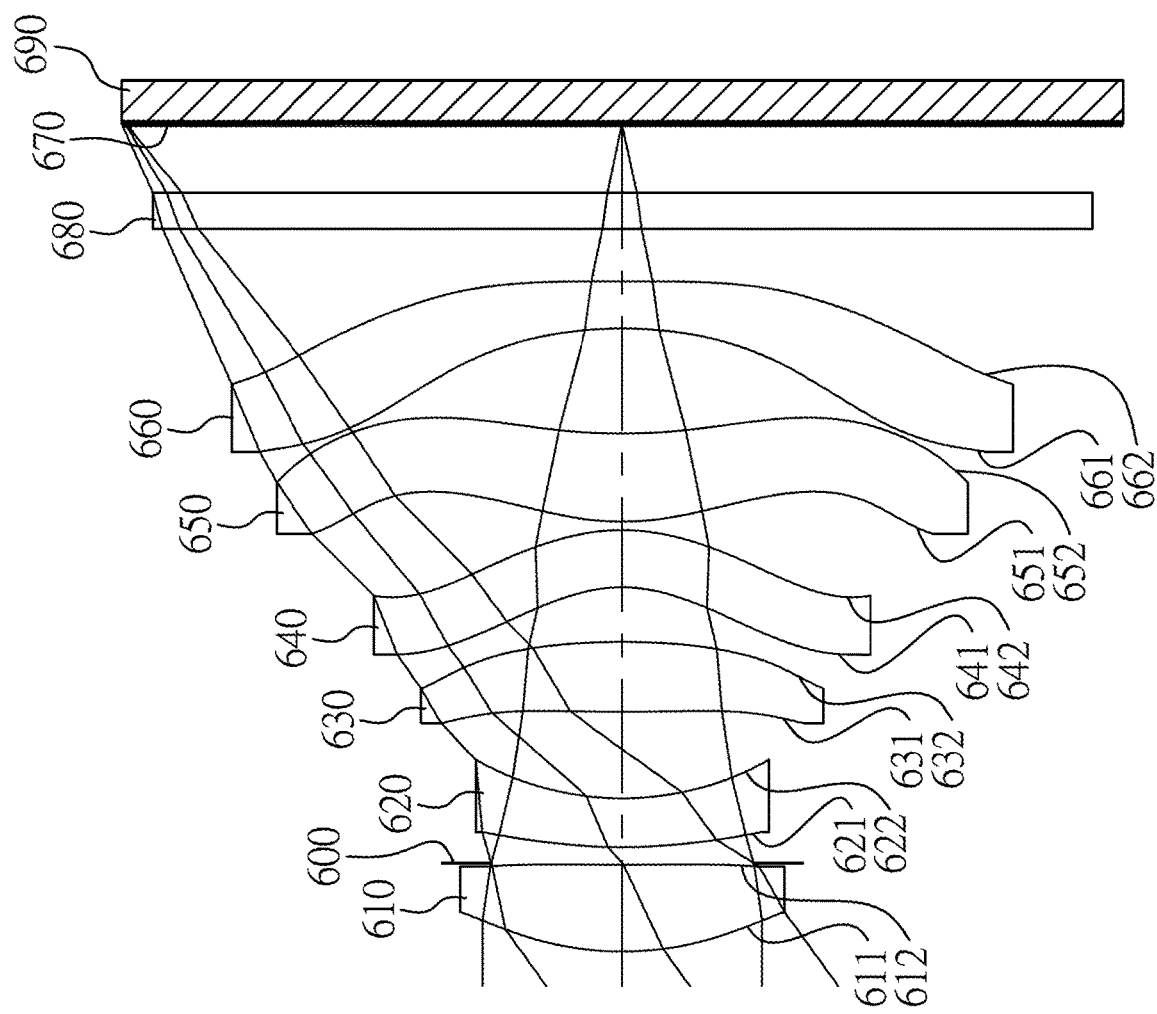
FIG. 11 is a schematic view of an optical image capturing system according to the 6th embodiment of the present disclosure.
Figure 12:
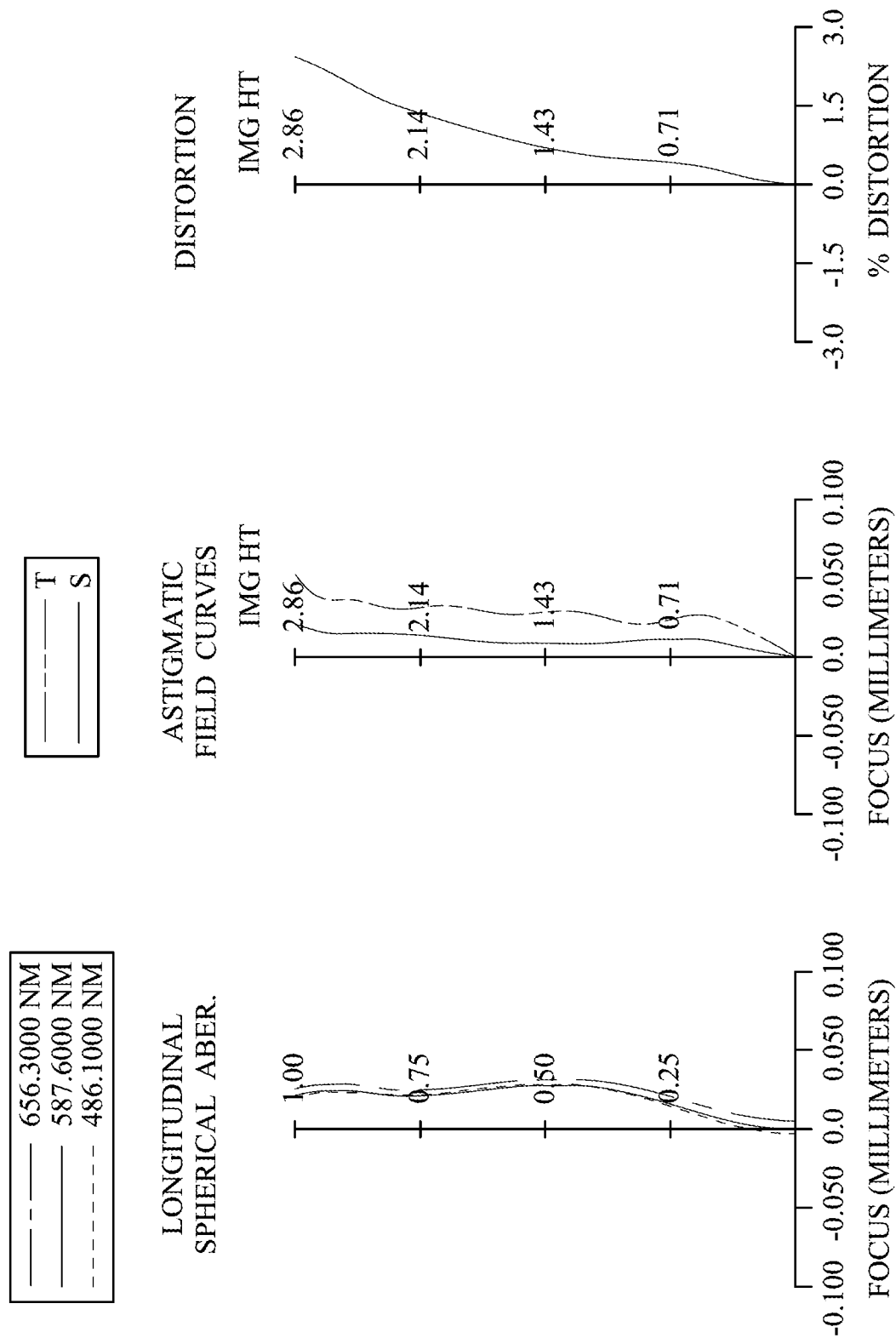
FIG. 12 shows spherical aberration curves, astigmatic field curves and a distortion curve of the optical image capturing system according to the 6th embodiment.

FIG. 11 is a schematic view of an optical image capturing system according to the 6th embodiment of the present disclosure. FIG. 12 shows spherical aberration curves, astigmatic field curves and a distortion curve of the optical image capturing system according to the 6th embodiment. In FIG. 11, the optical image capturing system includes, in order from an object side to an image side, a first lens element 610, an aperture stop 600, a second lens element 620, a third lens element 630, a fourth lens element 640, a fifth lens element 650, a sixth lens element 660, an IR-cut filter 680, an image plane 670 and an image sensor 690.

The first lens element 610 with positive refractive power has a convex object-side surface 611 and a concave image-side surface 612, and is made of plastic material. The object-side surface 611 and the image-side surface 612 of the first lens element 610 are aspheric.

The second lens element 620 with negative refractive power has a convex object-side surface 621 and a concave image-side surface 622, and is made of plastic material. The object-side surface 621 and the image-side surface 622 of the second lens element 620 are aspheric.

The third lens element 630 with positive refractive power has a convex object-side surface 631 and a convex image-side surface 632, and is made of plastic material. The object-side surface 631 and the image-side surface 632 of the third lens element 630 are aspheric.

The fourth lens element 640 with negative refractive power has a concave object-side surface 641 and a convex image-side surface 642, and is made of plastic material. The object-side surface 641 and the image-side surface 642 of the fourth lens element 640 are aspheric.

The fifth lens element 650 with positive refractive power has a convex object-side surface 651 and a concave image-side surface 652, and is made of plastic material. The object-side surface 651 and the image-side surface 652 of the fifth lens element 650 are aspheric. Furthermore, both of the object-side surface 651 and the image-side surface 652 of the fifth lens element 650 have at least one inflection point.

The sixth lens element 660 with negative refractive power has a concave object-side surface 661 and a convex image-side surface 662, and is made of plastic material. The object-side surface 661 and the image-side surface 662 of the sixth lens element 660 are aspheric. Furthermore, both of the object-side surface 661 and the image-side surface 662 of the sixth lens element 660 have at least one inflection point.

The IR-cut filter 680 is made of glass, and located between the sixth lens element 660 and the image plane 670, and will not affect the focal length of the optical image capturing system.

The detailed optical data of the 6th embodiment are shown in Table 11 and the aspheric surface data are shown in Table 12 below.

TABLE 11

Embodiment 6
f = 3.86 mm, Fno = 2.40, HFOV = 35.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.786 | ASP | 0.499 | Plastic | 1.560 | 57.0 | 3.45 |
| 2 | | 21.216 | ASP | 0.009 | | | | |
| 3 | Ape. Stop | Plano | | 0.090 | | | | |
| 4 | Lens 2 | 2.719 | ASP | 0.280 | Plastic | 1.632 | 23.4 | -6.48 |
| 5 | | 1.569 | ASP | 0.502 | | | | |
| 6 | Lens 3 | 12.304 | ASP | 0.401 | Plastic | 1.560 | 57.0 | 5.75 |
| 7 | | -4.308 | ASP | 0.314 | | | | |
| 8 | Lens 4 | -0.842 | ASP | 0.327 | Plastic | 1.650 | 21.4 | -6.15 |
| 9 | | -1.230 | ASP | 0.050 | | | | |
| 10 | Lens 5 | 1.492 | ASP | 0.510 | Plastic | 1.560 | 57.0 | 4.19 |
| 11 | | 3.595 | ASP | 0.603 | | | | |
| 12 | Lens 6 | -2.324 | ASP | 0.270 | Plastic | 1.535 | 55.7 | -4.58 |
| 13 | | -46.512 | ASP | 0.300 | | | | |
| 14 | IR-cut filter | Plano | | 0.210 | Glass | 1.517 | 64.2 | — |
| 15 | | Plano | | 0.399 | | | | |
| 16 | Image | Plano | | — | | | | |

Note:
Reference wavelength (d-line) is 587.6 nm.

TABLE 12

Aspheric Coefficients

| | Surface # | | | | | |
|---|---|---|---|---|---|---|
| | 1 | 2 | 4 | 5 | 6 | 7 |
| k= | -4.4463E-01 | 3.0000E+00 | -2.1932E+01 | -2.8741E+00 | -1.0000E+00 | 7.9947E+00 |
| A4= | -8.5220E-03 | -1.1749E-01 | -6.7382E-02 | -3.8831E-02 | -8.9937E-02 | -5.6506E-02 |
| A6= | 1.3833E-02 | 2.2125E-01 | 2.1399E-01 | 1.7208E-01 | 9.1695E-03 | 6.2745E-02 |
| A8= | -6.0930E-02 | -3.6011E-01 | -2.5385E-01 | -6.5711E-02 | -9.3073E-02 | -2.0823E-01 |
| A10= | 3.1680E-02 | 2.6815E-01 | 1.5051E-01 | -4.2613E-02 | 9.5551E-02 | 3.1716E-01 |
| A12= | -1.4446E-02 | -6.7746E-02 | -3.1339E-02 | 2.3429E-02 | -5.2080E-02 | -3.2139E-01 |
| A14= | 8.9264E-03 | -1.8497E-02 | 1.1359E-02 | 8.1485E-03 | 4.8054E-02 | 1.9622E-01 |
| A16= | -2.0306E-02 | -3.2149E-02 | -3.2557E-02 | 1.1659E-02 | -1.5481E-02 | -4.6517E-02 |

TABLE 12-continued

Aspheric Coefficients

| Surface # | 8 | 9 | 10 | 11 | 12 | 13 |
|---|---|---|---|---|---|---|
| k= | −3.4629E+00 | −9.4138E−01 | −1.0540E+01 | −1.0000E+01 | 4.2855E−02 | −1.0000E+00 |
| A4= | 1.0068E−02 | 9.3110E−02 | 4.5391E−02 | 3.9906E−02 | 1.7763E−03 | −6.8571E−02 |
| A6= | 3.1911E−02 | −1.3558E−02 | −1.7218E−01 | −1.4285E−01 | −7.8263E−02 | −1.4854E−02 |
| A8= | 9.7830E−03 | 2.5804E−02 | 1.5202E−01 | 1.0778E−01 | 7.6942E−02 | 3.1813E−02 |
| A10= | −6.1362E−03 | −6.2181E−03 | −8.1977E−02 | −4.6930E−02 | −2.8220E−02 | −1.4826E−02 |
| A12= | 5.0711E−05 | −5.2191E−04 | 2.4866E−02 | 1.2467E−02 | 5.2179E−03 | 3.2606E−03 |
| A14= | −3.8271E−04 | 5.5247E−05 | −3.7251E−03 | −1.8654E−03 | −4.7957E−04 | −3.4298E−04 |
| A16= | 6.3394E−05 | — | 2.1166E−04 | 1.1884E−04 | 1.7329E−05 | 1.3653E−05 |

In the optical image capturing system according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following relationships:

| | | | |
|---|---|---|---|
| f [mm] | 3.86 | (R3 − R4)/(R3 + R4) | 0.27 |
| Fno | 2.40 | (R7 − R8)/(R7 + R8) | −0.19 |
| HFOV [deg.] | 35.7 | f1/f5 | 0.82 |
| V4/V5 | 0.38 | f6/f2 | 0.71 |
| CT4/CT3 | 0.82 | Sag61/CT6 | −2.63 |
| T45/T56 | 0.08 | Yc51/Yc52 | 1.03 |
| R9/|R10| | 0.42 | TL/ImgH | 1.67 |
| R11/R12 | 0.05 | | |

7th Embodiment

Figure 13:
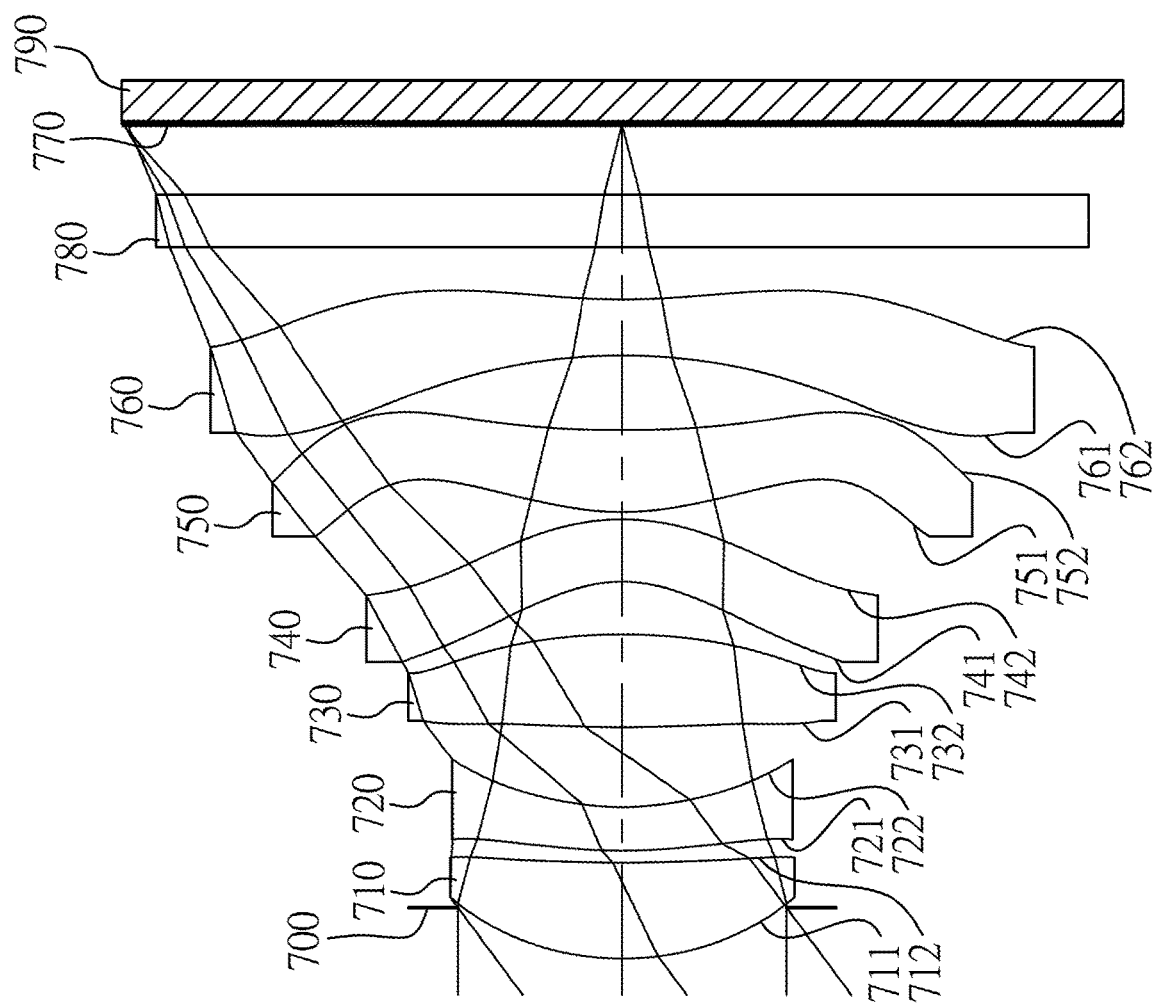
FIG. 13 is a schematic view of an optical image capturing system according to the 7th embodiment of the present disclosure.
Figure 14:
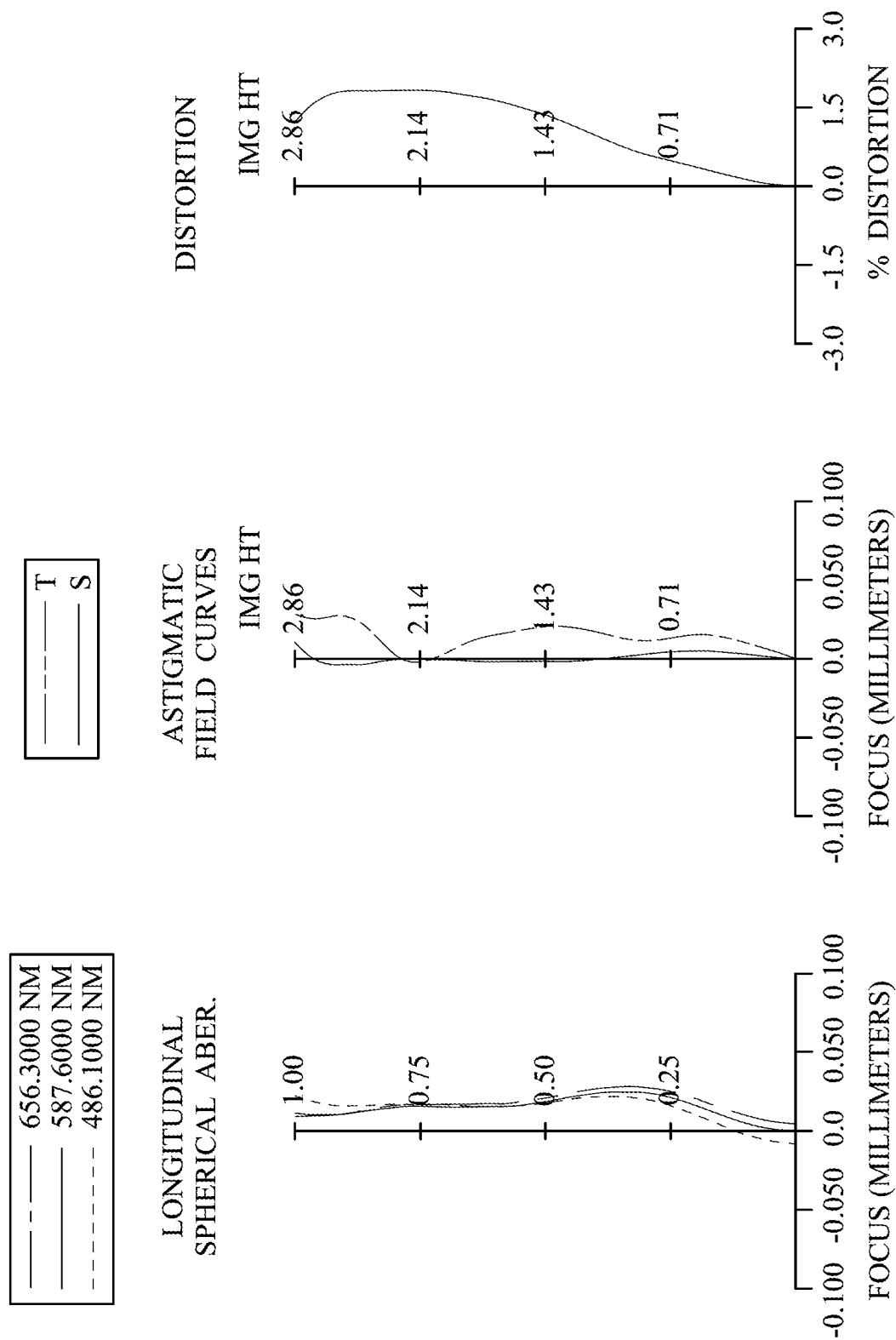
FIG. 14 shows spherical aberration curves, astigmatic field curves and a distortion curve of the optical image capturing system according to the 7th embodiment.

FIG. 13 is a schematic view of an optical image capturing system according to the 7th embodiment of the present disclosure. FIG. 14 shows spherical aberration curves, astigmatic field curves and a distortion curve of the optical image capturing system according to the 7th embodiment. In FIG. 13, the optical image capturing system includes, in order from an object side to an image side, an aperture stop 700, a first lens element 710, a second lens element 720, a third lens element 730, a fourth lens element 740, a fifth lens element 750, a sixth lens element 760, an IR-cut filter 780, an image plane 770 and an image sensor 790.

The first lens element 710 with positive refractive power has a convex object-side surface 711 and a concave image-side surface 712, and is made of plastic material. The object-side surface 711 and the image-side surface 712 of the first lens element 710 are aspheric.

The second lens element 720 with negative refractive power has a convex object-side surface 721 and a concave image-side surface 722, and is made of plastic material. The object-side surface 721 and the image-side surface 722 of the second lens element 720 are aspheric.

The third lens element 730 with positive refractive power has a convex object-side surface 731 and a convex image-side surface 732, and is made of plastic material. The object-side surface 731 and the image-side surface 732 of the third lens element 730 are aspheric.

The fourth lens element 740 with negative refractive power has a concave object-side surface 741 and a convex image-side surface 742, and is made of plastic material. The object-side surface 741 and the image-side surface 742 of the fourth lens element 740 are aspheric.

The fifth lens element 750 with positive refractive power has a convex object-side surface 751 and a concave image-side surface 752, and is made of plastic material. The object-side surface 751 and the image-side surface 752 of the fifth lens element 750 are aspheric. Furthermore, both of the object-side surface 751 and the image-side surface 752 of the fifth lens element 750 have at least one inflection point.

The sixth lens element 760 with negative refractive power has a concave object-side surface 761 and a concave image-side surface 762, and is made of plastic material. The object-side surface 761 and the image-side surface 762 of the sixth lens element 760 are aspheric. Furthermore, both of the object-side surface 761 and the image-side surface 762 of the sixth lens element 760 have at least one inflection point.

The IR-cut filter 780 is made of glass, and located between the sixth lens element 760 and the image plane 770, and will not affect the focal length of the optical image capturing system.

The detailed optical data of the 7th embodiment are shown in Table 13 and the aspheric surface data are shown in Table 14 below.

TABLE 13

Embodiment 7
f = 3.80 mm, Fno = 2.02, HFOV = 36.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.291 | | | | |
| 2 | Lens 1 | 1.616 | ASP | 0.550 | Plastic | 1.544 | 55.9 | 3.65 |
| 3 | | 7.649 | ASP | 0.067 | | | | |
| 4 | Lens 2 | 2.772 | ASP | 0.250 | Plastic | 1.640 | 23.3 | −7.18 |
| 5 | | 1.668 | ASP | 0.461 | | | | |
| 6 | Lens 3 | 7.809 | ASP | 0.529 | Plastic | 1.544 | 55.9 | 4.52 |
| 7 | | −3.507 | ASP | 0.302 | | | | |
| 8 | Lens 4 | −0.827 | ASP | 0.358 | Plastic | 1.640 | 23.3 | −5.52 |
| 9 | | −1.262 | ASP | 0.041 | | | | |
| 10 | Lens 5 | 1.658 | ASP | 0.473 | Plastic | 1.544 | 55.9 | 3.60 |
| 11 | | 9.654 | ASP | 0.426 | | | | |
| 12 | Lens 6 | −3.352 | ASP | 0.320 | Plastic | 1.535 | 55.7 | −3.33 |
| 13 | | 3.928 | ASP | 0.300 | | | | |
| 14 | IR-cut filter | Plano | | 0.300 | Glass | 1.517 | 64.2 | — |
| 15 | | Plano | | 0.409 | | | | |
| 16 | Image | Plano | | — | | | | |

Note:
Reference wavelength (d-line) is 587.6 nm.

TABLE 14

Aspheric Coefficients

| Surface # | | | | | |
|---|---|---|---|---|---|
| 2 | 3 | 4 | 5 | 6 | 7 |
| k= −5.5943E−03 | 3.8697E+01 | −3.5152E+01 | −4.4929E+00 | 9.3059E+00 | 4.4692E+00 |
| A4= 3.5013E−03 | −1.4714E−01 | −8.7427E−02 | −5.1879E−02 | −6.6570E−02 | −2.4916E−02 |
| A6= 2.8590E−02 | 3.2662E−01 | 1.8547E−01 | 1.9665E−01 | 3.8801E−02 | 5.5848E−02 |
| A8= −4.8569E−02 | −3.8461E−01 | −1.6093E−01 | −1.3097E−01 | −8.7581E−02 | −1.2462E−01 |
| A10= 6.1069E−02 | 2.3175E−01 | 2.6845E−02 | 2.1070E−02 | 8.8762E−02 | 1.4026E−01 |
| A12= −2.4085E−02 | −8.4495E−02 | −1.4517E−02 | 1.6532E−02 | −3.8250E−02 | −6.7935E−02 |
| A14= −2.0081E−03 | 5.8276E−04 | 7.9532E−04 | 1.0536E−03 | 3.0155E−02 | 1.5111E−02 |
| A16= −7.2161E−04 | −2.5055E−12 | 2.5328E−12 | −2.4416E−12 | −1.3338E−02 | — |

| Surface # | | | | | |
|---|---|---|---|---|---|
| 8 | 9 | 10 | 11 | 12 | 13 |
| k= −3.3321E+00 | −9.6014E−01 | −1.1431E+01 | −5.1531E+00 | 2.6634E−01 | 7.4718E−01 |
| A4= −6.5614E−03 | 9.4395E−02 | 3.5907E−02 | 9.1006E−02 | −5.2779E−02 | −1.2031E−01 |
| A6= 3.1351E−02 | −2.1274E−02 | −6.5872E−02 | −7.6079E−02 | 2.2766E−03 | 6.4678E−02 |
| A8= 1.2693E−02 | 2.3279E−02 | 2.5934E−02 | 1.8706E−02 | 1.3013E−03 | −3.4778E−02 |
| A10= −6.2387E−03 | −5.9469E−03 | −1.2987E−02 | −2.6640E−03 | −1.6620E−04 | 1.1895E−02 |
| A12= −6.8004E−04 | −3.0378E−04 | 3.4613E−03 | 2.8876E−04 | −1.7372E−06 | −2.3095E−03 |
| A14= −1.3015E−03 | 3.4636E−05 | −1.3197E−04 | −3.2701E−05 | 5.6165E−07 | 2.3505E−04 |
| A16= −1.9784E−12 | — | −3.7644E−05 | 3.1002E−06 | — | −9.7414E−06 |

In the optical image capturing system according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following relationships:

| f [mm] | 3.80 | (R3 − R4)/(R3 + R4) | 0.25 |
|---|---|---|---|
| Fno | 2.02 | (R7 − R8)/(R7 + R8) | −0.21 |
| HFOV [deg.] | 36.5 | f1/f5 | 1.01 |
| V4/V5 | 0.42 | f6/f2 | 0.46 |
| CT4/CT3 | 0.68 | Sag61/CT6 | −1.38 |
| T45/T56 | 0.10 | Yc51/Yc52 | 0.91 |
| R9/|R10| | 0.17 | TL/ImgH | 1.68 |
| R11/R12 | −0.85 | | |

8th Embodiment

Figure 15:
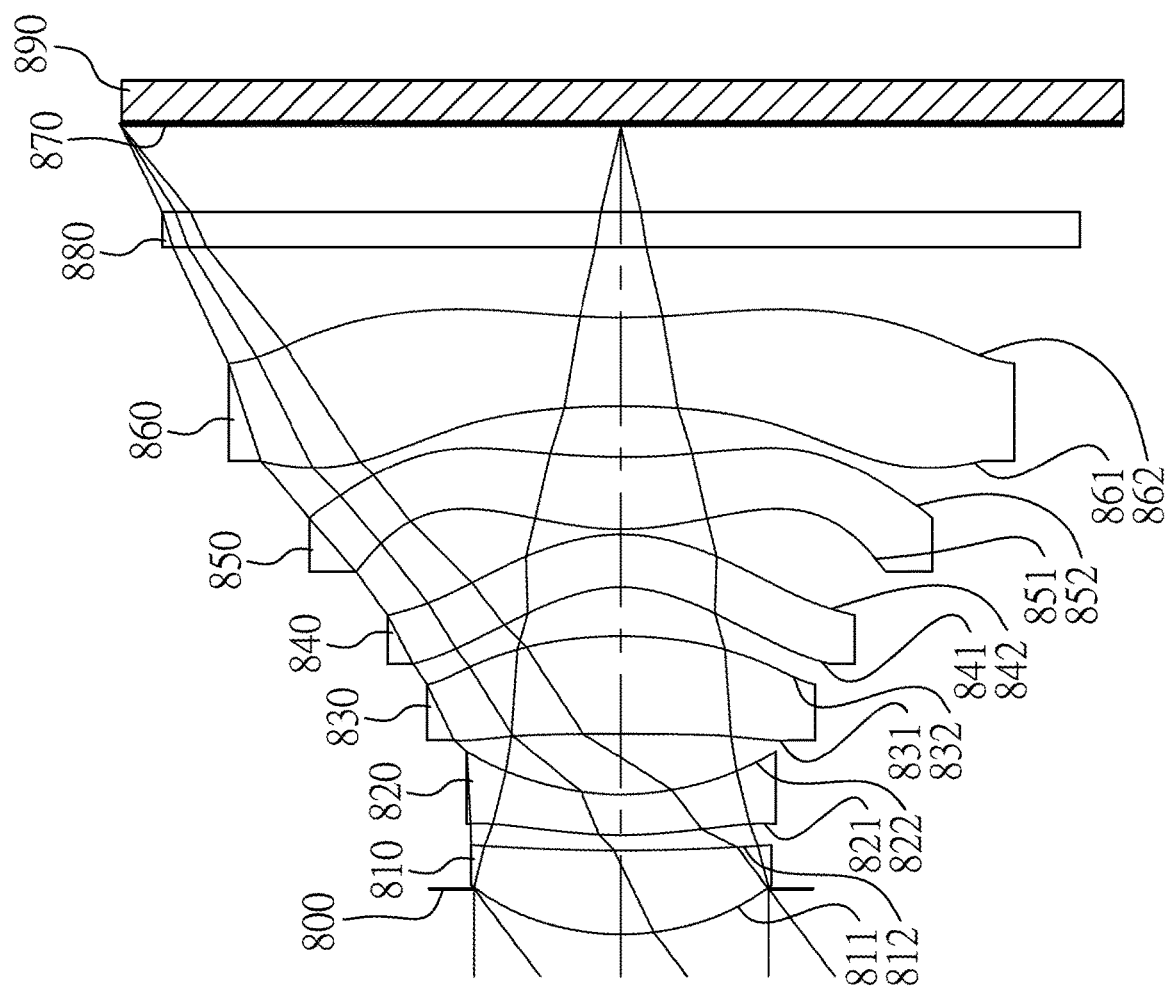
FIG. 15 is a schematic view of an optical image capturing system according to the 8th embodiment of the present disclosure.
Figure 16:
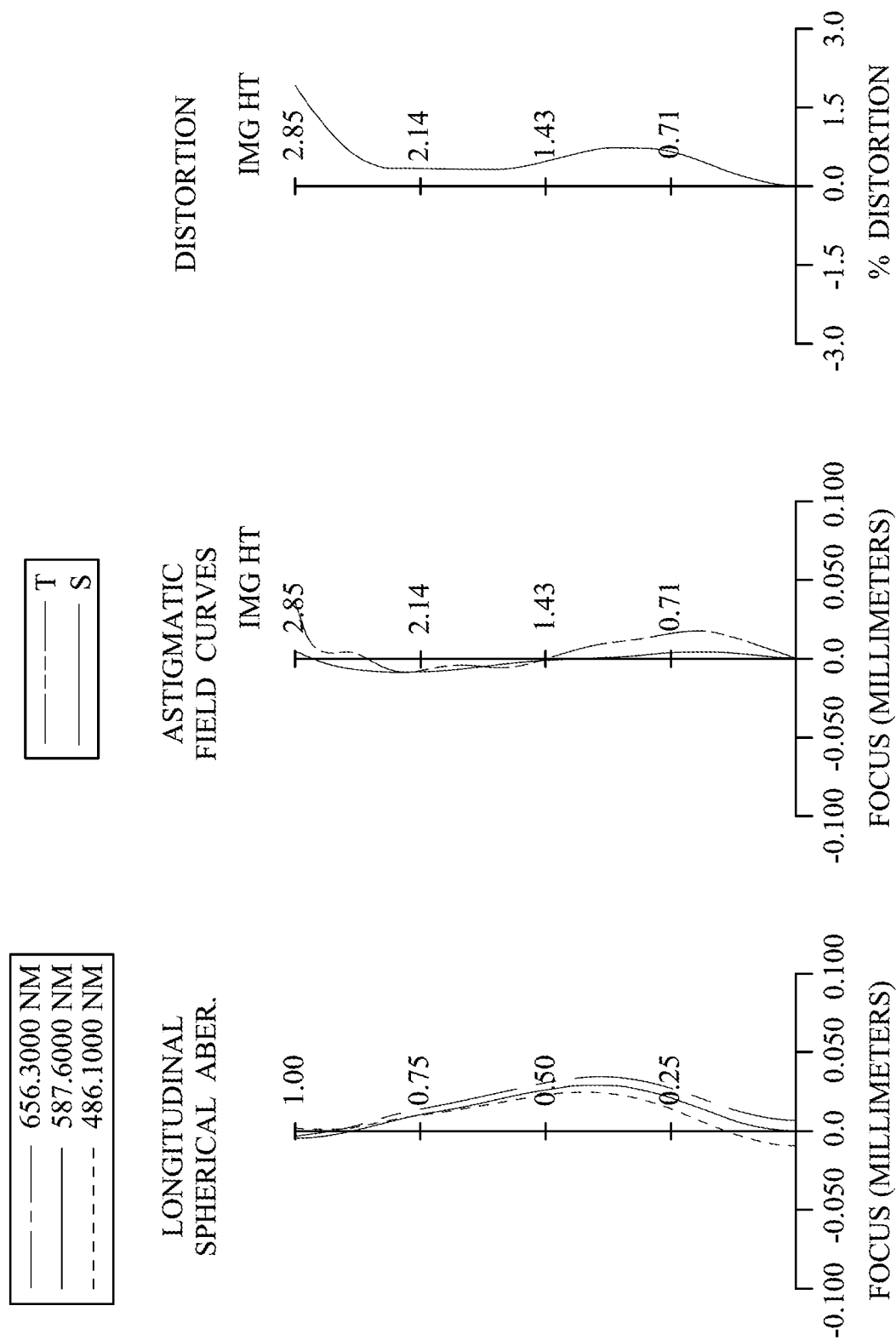
FIG. 16 shows spherical aberration curves, astigmatic field curves and a distortion curve of the optical image capturing system according to the 8th embodiment.

FIG. 15 is a schematic view of an optical image capturing system according to the 8th embodiment of the present disclosure. FIG. 16 shows spherical aberration curves, astigmatic field curves and a distortion curve of the optical image capturing system according to the 8th embodiment. In FIG. 15, the optical image capturing system includes, in order from an object side to an image side, an aperture stop 800, a first lens element 810, a second lens element 820, a third lens element 830, a fourth lens element 840, a fifth lens element 850, a sixth lens element 860, an IR-cut filter 880, an image plane 870 and an image sensor 890.

The first lens element 810 with positive refractive power has a convex object-side surface 811 and a concave image-side surface 812, and is made of plastic material. The object-side surface 811 and the image-side surface 812 of the first lens element 810 are aspheric.

The second lens element 820 with negative refractive power has a convex object-side surface 821 and a concave image-side surface 822, and is made of plastic material. The object-side surface 821 and the image-side surface 822 of the second lens element 820 are aspheric.

The third lens element 830 with positive refractive power has a concave object-side surface 831 and a convex image-side surface 832, and is made of plastic material. The object-side surface 831 and the image-side surface 832 of the third lens element 830 are aspheric.

The fourth lens element 840 with negative refractive power has a concave object-side surface 841 and a convex image-side surface 842, and is made of plastic material. The object-side surface 841 and the image-side surface 842 of the fourth lens element 840 are aspheric.

The fifth lens element 850 with positive refractive power has a convex object-side surface 851 and a concave image-side surface 852, and is made of plastic material. The object-side surface 851 and the image-side surface 852 of the fifth lens element 850 are aspheric. Furthermore, both of the object-side surface 851 and the image-side surface 852 of the fifth lens element 850 have at least one inflection point.

The sixth lens element 860 with negative refractive power has a concave object-side surface 861 and a concave image-side surface 862, and is made of plastic material. The object-side surface 861 and the image-side surface 862 of the sixth lens element 860 are aspheric. Furthermore, both of the object-side surface 861 and the image-side surface 862 of the sixth lens element 860 have at least one inflection point.

The IR-cut filter 880 is made of glass, and located between the sixth lens element 860 and the image plane 870, and will not affect the focal length of the optical image capturing system.

The detailed optical data of the 8th embodiment are shown in Table 15 and the aspheric surface data are shown in Table 16 below.

TABLE 15

Embodiment 8
f = 3.69 mm, Fno = 2.20, HFOV = 37.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.260 | | | | |
| 2 | Lens 1 | 1.512 ASP | 0.477 | Plastic | 1.550 | 56.0 | 3.34 |
| 3 | | 7.587 ASP | 0.089 | | | | |
| 4 | Lens 2 | 2.377 ASP | 0.230 | Plastic | 1.639 | 23.5 | −6.51 |
| 5 | | 1.456 ASP | 0.350 | | | | |
| 6 | Lens 3 | −58.133 ASP | 0.555 | Plastic | 1.550 | 56.0 | 5.01 |
| 7 | | −2.638 ASP | 0.280 | | | | |
| 8 | Lens 4 | −0.787 ASP | 0.300 | Plastic | 1.639 | 23.5 | −7.00 |
| 9 | | −1.098 ASP | 0.030 | | | | |
| 10 | Lens 5 | 1.540 ASP | 0.415 | Plastic | 1.550 | 56.0 | 4.12 |
| 11 | | 4.338 ASP | 0.290 | | | | |
| 12 | Lens 6 | −4.685 ASP | 0.504 | Plastic | 1.535 | 55.7 | −3.98 |
| 13 | | 4.041 ASP | 0.400 | | | | |
| 14 | IR-cut filter | Plano | 0.200 | Glass | 1.517 | 64.2 | — |
| 15 | | Plano | 0.508 | | | | |
| 16 | Image | Plano | — | | | | |

Note:
Reference wavelength (d-line) is 587.6 nm.

TABLE 16

Aspheric Coefficients

| Surface # | | | | | |
|---|---|---|---|---|---|
| 2 | 3 | 4 | 5 | 6 | 7 |
| k= 5.5914E−02 | 2.0874E+00 | −2.4848E+01 | −4.6249E+00 | −1.0000E+00 | 3.5337E+00 |
| A4= 9.3012E−03 | −1.2608E−01 | −1.1685E−01 | −4.4367E−02 | −8.3827E−02 | −5.2403E−02 |
| A6= 3.0382E−02 | 3.0760E−01 | 1.9211E−01 | 2.1646E−01 | 3.8640E−02 | 9.2661E−02 |
| A8= −4.1783E−02 | −3.8206E−01 | −1.7697E−01 | −1.2569E−01 | −8.0143E−02 | −1.9421E−01 |
| A10= 5.9125E−02 | 2.5566E−01 | 2.0806E−02 | 8.4190E−03 | 1.0282E−01 | 3.2262E−01 |
| A12= −1.7197E−02 | −6.9000E−02 | −1.9295E−02 | 1.3115E−02 | −1.3831E−02 | −3.1996E−01 |
| A14= 1.1168E−02 | −1.2319E−02 | 1.3205E−02 | 1.2717E−02 | 4.4641E−02 | 1.9672E−01 |
| A16= −1.4540E−02 | −2.5712E−02 | −3.8172E−02 | 1.3495E−02 | −2.8123E−02 | −4.5687E−02 |

| Surface # | | | | | |
|---|---|---|---|---|---|
| 8 | 9 | 10 | 11 | 12 | 13 |
| k= −3.2535E+00 | −1.0392E+00 | −1.1464E+01 | −2.9962E+00 | 1.3779E+00 | −1.0000E+00 |
| A4= −1.0814E−02 | 1.0137E−01 | −3.1221E−03 | 7.8925E−03 | −1.0821E−02 | −8.2669E−02 |
| A6= 3.2529E−02 | −1.3920E−02 | −1.7165E−01 | −1.5809E−01 | −7.9059E−02 | −1.4811E−02 |
| A8= 1.3923E−02 | 2.4374E−02 | 1.4960E−01 | 1.1128E−01 | 7.6862E−02 | 3.1772E−02 |
| A10= −5.7565E−03 | −6.8419E−03 | −8.2533E−02 | −4.5112E−02 | −2.8229E−02 | −1.4846E−02 |
| A12= −1.7557E−04 | −7.9766E−04 | 2.4910E−02 | 1.2252E−02 | 5.2171E−03 | 3.2595E−03 |
| A14= −8.5839E−04 | −4.3730E−05 | −3.6516E−03 | −1.9320E−03 | −4.8028E−04 | −3.4252E−04 |
| A16= −3.1010E−04 | — | 2.4794E−04 | 1.2224E−04 | 1.7147E−05 | 1.3832E−05 |

In the optical image capturing system according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following relationships:

| f [mm] | 3.69 | (R3 − R4)/(R3 + R4) | 0.24 |
|---|---|---|---|
| Fno | 2.20 | (R7 − R8)/(R7 + R8) | −0.16 |
| HFOV [deg.] | 37.1 | f1/f5 | 0.81 |
| V4/V5 | 0.42 | f6/f2 | 0.61 |
| CT4/CT3 | 0.54 | Sag61/CT6 | −0.62 |
| T45/T56 | 0.10 | Yc51/Yc52 | 1.07 |
| R9/|R10| | 0.35 | TL/ImgH | 1.62 |
| R11/R12 | −1.16 | | |

9th Embodiment

Figure 17:
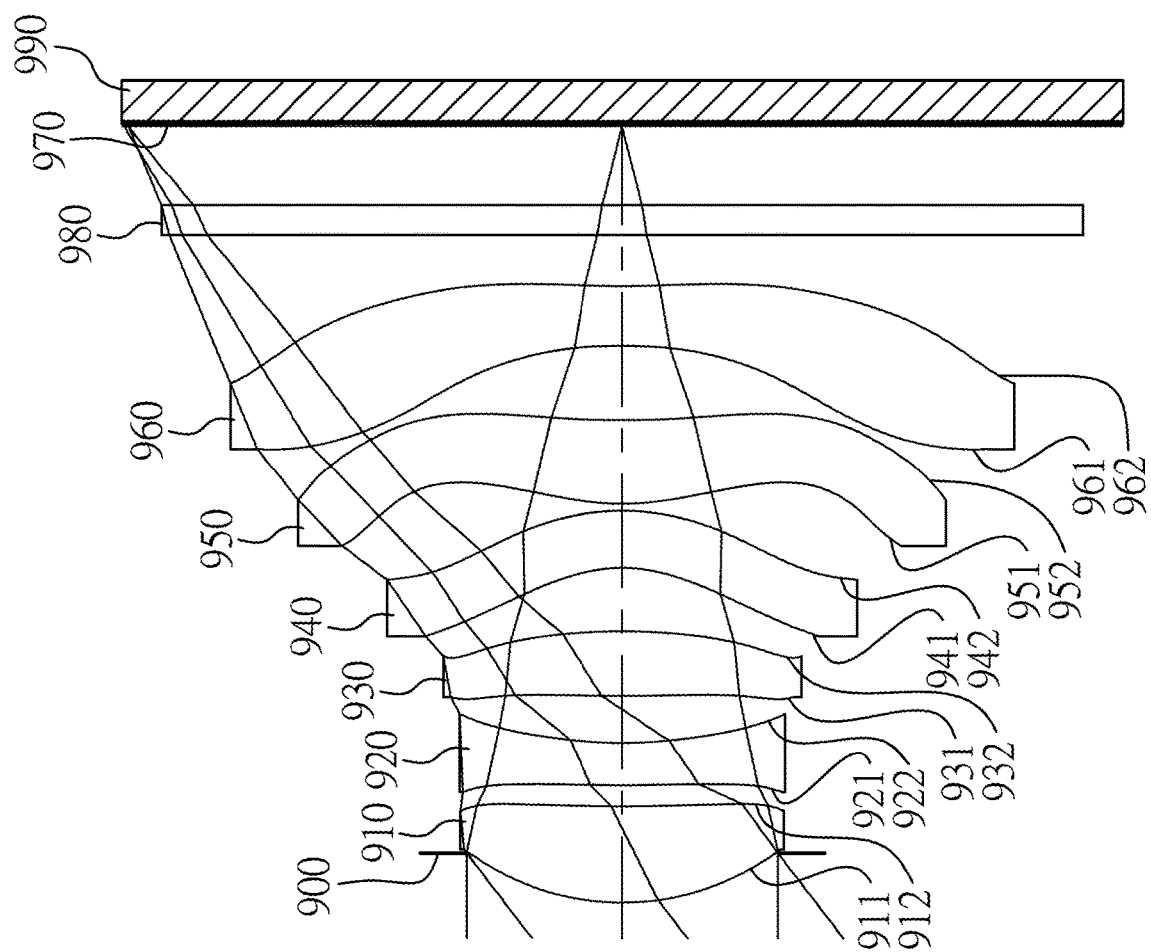
FIG. 17 is a schematic view of an optical image capturing system according to the 9th embodiment of the present disclosure.
Figure 18:
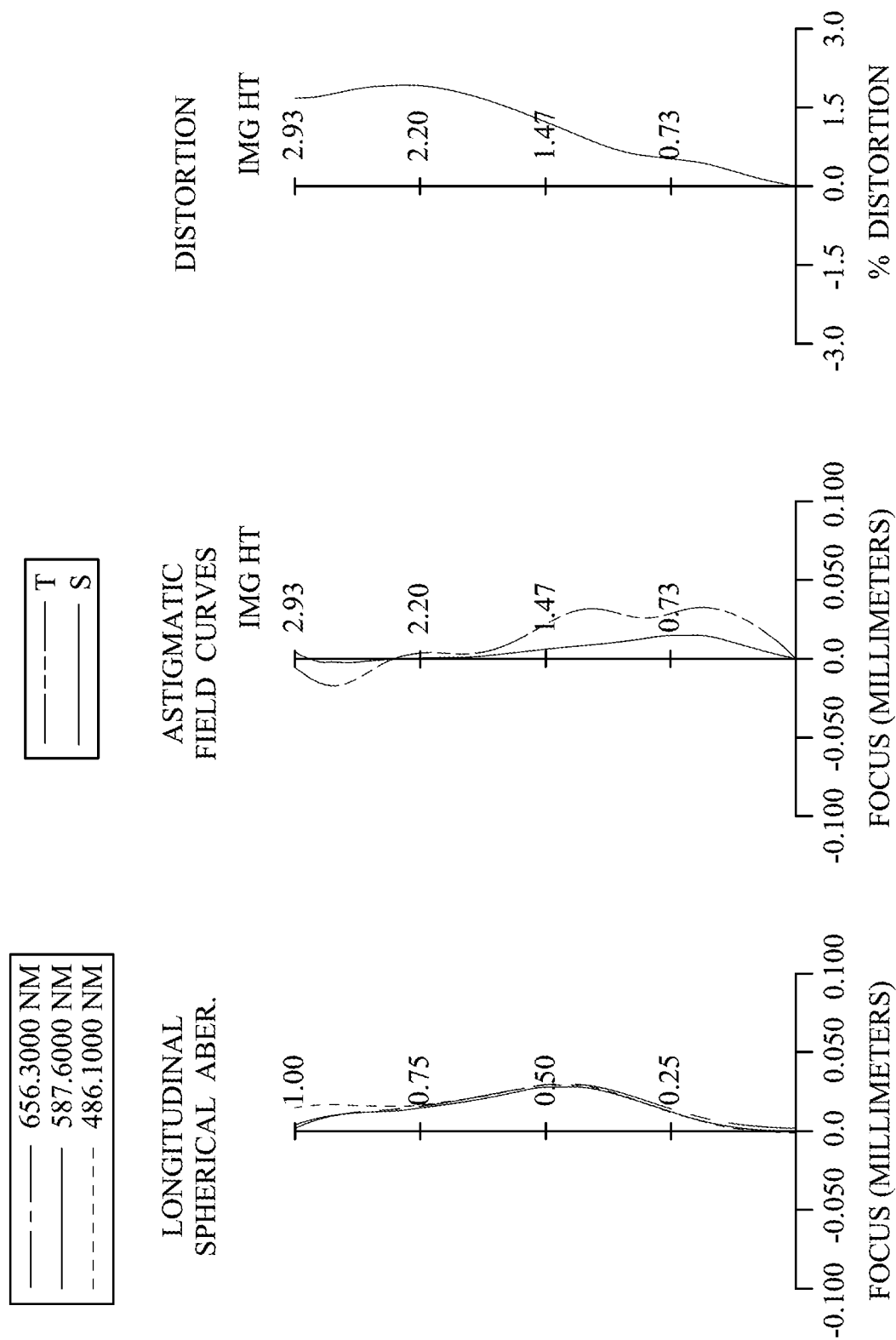
FIG. 18 shows spherical aberration curves, astigmatic field curves and a distortion curve of the optical image capturing system according to the 9th embodiment.

FIG. 17 is a schematic view of an optical image capturing system according to the 9th embodiment of the present disclosure. FIG. 18 shows spherical aberration curves, astigmatic field curves and a distortion curve of the optical image capturing system according to the 9th embodiment. In FIG. 17, the optical image capturing system includes, in order from an object side to an image side, an aperture stop 900, a first lens element 910, a second lens element 920, a third lens element 930, a fourth lens element 940, a fifth lens element 950, a sixth lens element 960, an IR-cut filter 980, an image plane 970 and an image sensor 990.

The first lens element 910 with positive refractive power has a convex object-side surface 911 and a concave image-side surface 912, and is made of plastic material. The object-side surface 911 and the image-side surface 912 of the first lens element 910 are aspheric.

The second lens element 920 with negative refractive power has a convex object-side surface 921 and a concave image-side surface 922, and is made of plastic material. The object-side surface 921 and the image-side surface 922 of the second lens element 920 are aspheric.

The third lens element 930 with positive refractive power has a convex object-side surface 931 and a convex image-side surface 932, and is made of plastic material. The object-side surface 931 and the image-side surface 932 of the third lens element 930 are aspheric.

The fourth lens element 940 with negative refractive power has a concave object-side surface 941 and a convex image-side surface 942, and is made of plastic material. The object-side surface 941 and the image-side surface 942 of the fourth lens element 940 are aspheric.

The fifth lens element 950 with positive refractive power has a convex object-side surface 951 and a concave image-side surface 952, and is made of plastic material. The object-side surface 951 and the image-side surface 952 of the fifth lens element 950 are aspheric. Furthermore, both of the object-side surface 951 and the image-side surface 952 of the fifth lens element 950 have at least one inflection point.

The sixth lens element 960 with negative refractive power has a concave object-side surface 961 and a concave image-side surface 962, and is made of plastic material. The object-side surface 961 and the image-side surface 162 of the sixth lens element 960 are aspheric. Furthermore, both of the object-side surface 961 and the image-side surface 962 of the sixth lens element 960 have at least one inflection point.

The IR-cut filter 980 is made of glass, and located between the sixth lens element 960 and the image plane 970, and will not affect the focal length of the optical image capturing system.

The detailed optical data of the 9th embodiment are shown in Table 17 and the aspheric surface data are shown in Table 18 below.

TABLE 17

Embodiment 9
f = 3.75 mm, Fno = 2.05, HFOV = 37.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.290 | | | | |
| 2 | Lens 1 | 1.534 ASP | 0.565 | Plastic | 1.544 | 55.9 | 3.31 |
| 3 | | 9.051 ASP | 0.124 | | | | |
| 4 | Lens 2 | 7.127 ASP | 0.250 | Plastic | 1.640 | 23.3 | −5.95 |
| 5 | | 2.447 ASP | 0.277 | | | | |
| 6 | Lens 3 | 10.259 ASP | 0.379 | Plastic | 1.544 | 55.9 | 4.99 |
| 7 | | −3.646 ASP | 0.373 | | | | |
| 8 | Lens 4 | −0.866 ASP | 0.335 | Plastic | 1.640 | 23.3 | −4.84 |
| 9 | | −1.383 ASP | 0.040 | | | | |
| 10 | Lens5 | 1.485 ASP | 0.495 | Plastic | 1.544 | 55.9 | 3.36 |
| 11 | | 6.937 ASP | 0.435 | | | | |
| 12 | Lens 6 | −3.041 ASP | 0.350 | Plastic | 1.535 | 55.7 | −3.60 |
| 13 | | 5.461 ASP | 0.300 | | | | |
| 14 | IR-cut filter | Plano | 0.175 | Glass | 1.517 | 64.2 | — |
| 15 | | Plano | 0.483 | | | | |
| 16 | Image | Plano | — | | | | |

Note:
Reference wavelength (d-line) is 587.6 nm.

TABLE 18

Aspheric Coefficients

| Surface # | | | | | |
|---|---|---|---|---|---|
| 2 | 3 | 4 | 5 | 6 | 7 |

| | 2 | 3 | 4 | 5 | 6 | 7 |
|---|---|---|---|---|---|---|
| k= | −9.7181E−02 | 1.3676E+01 | −6.5094E+01 | −9.9561E+00 | −3.7434E+01 | 5.6319E+00 |
| A4= | 1.2723E−02 | −7.7467E−02 | −1.9406E−01 | −8.6036E−02 | −9.9193E−02 | 3.7936E−03 |
| A6= | −6.5319E−02 | −4.2461E−02 | 9.2884E−02 | 2.0326E−01 | 1.3634E−01 | −9.3620E−03 |
| A8= | 3.4532E−01 | 8.1250E−01 | 1.1495E+00 | −5.8608E−02 | −7.9424E−01 | −1.6839E−01 |
| A10= | −8.3382E−01 | −2.7780E+00 | −4.4863E+00 | −1.1629E−01 | 2.1258E+00 | 4.3257E−01 |
| A12= | 9.9958E−01 | 4.6506E+00 | 8.0014E+00 | 1.2346E−01 | −3.2989E+00 | −5.2821E−01 |
| A14= | −5.1237E−01 | −4.1228E+00 | −7.4642E+00 | −7.0618E−02 | 2.7911E+00 | 3.1015E−01 |
| A16= | 3.4762E−02 | 1.4459E+00 | 2.8060E+00 | 4.6475E−02 | −9.1387E−01 | −3.6032E−02 |

| Surface # | | | | | |
|---|---|---|---|---|---|
| 8 | 9 | 10 | 11 | 12 | 13 |

| | 8 | 9 | 10 | 11 | 12 | 13 |
|---|---|---|---|---|---|---|
| k= | −4.3577E+00 | −6.3966E−01 | −1.3483E+01 | −5.1989E+00 | 1.0427E−01 | 1.1352E+00 |
| A4= | −8.6706E−02 | −1.3442E−03 | 4.2093E−02 | 9.7916E−02 | −1.1151E−01 | −1.9302E−01 |
| A6= | 1.1091E−01 | 3.7675E−02 | −2.7921E−01 | −3.4097E−01 | 2.5821E−01 | 1.2839E−01 |
| A8= | −1.1670E−01 | 5.8662E−02 | 3.2127E−01 | 3.4649E−01 | 2.9371E−02 | −5.9264E−02 |
| A10= | 3.5863E−01 | −4.1188E−02 | −2.0170E−01 | −1.9913E−01 | −1.6265E−02 | 1.8014E−02 |
| A12= | −4.9817E−01 | 1.0262E−02 | 6.0801E−02 | 6.5479E−02 | 3.4352E−03 | −3.4922E−03 |
| A14= | 3.0172E−01 | −1.4022E−03 | −6.8368E−03 | −1.1346E−02 | −3.3103E−04 | 3.8291E−04 |
| A16= | −6.9450E−02 | — | 1.5676E−05 | 7.9832E−04 | 1.1843E−05 | −1.7595E−05 |

In the optical image capturing system according to the 9th embodiment, the definitions of these parameters shown in the following table are the same as those stated in the 1st embodiment with corresponding values for the 9th embodiment. Moreover, these parameters can be calculated from Table 17 and Table 18 as the following values and satisfy the following relationships:

| f [mm] | 3.75 | (R3 − R4)/(R3 + R4) | 0.49 |
|---|---|---|---|
| Fno | 2.05 | (R7 − R8)/(R7 + R8) | −0.23 |
| HFOV [deg.] | 37.5 | f1/f5 | 0.98 |
| V4/V5 | 0.42 | f6/f2 | 0.61 |
| CT4/CT3 | 0.88 | Sag61/CT6 | −1.73 |
| T45/T56 | 0.09 | Yc51/Yc52 | 1.13 |
| R9/|R10| | 0.21 | TL/ImgH | 1.56 |
| R11/R12 | −0.56 | | |

10th Embodiment

Figure 19:
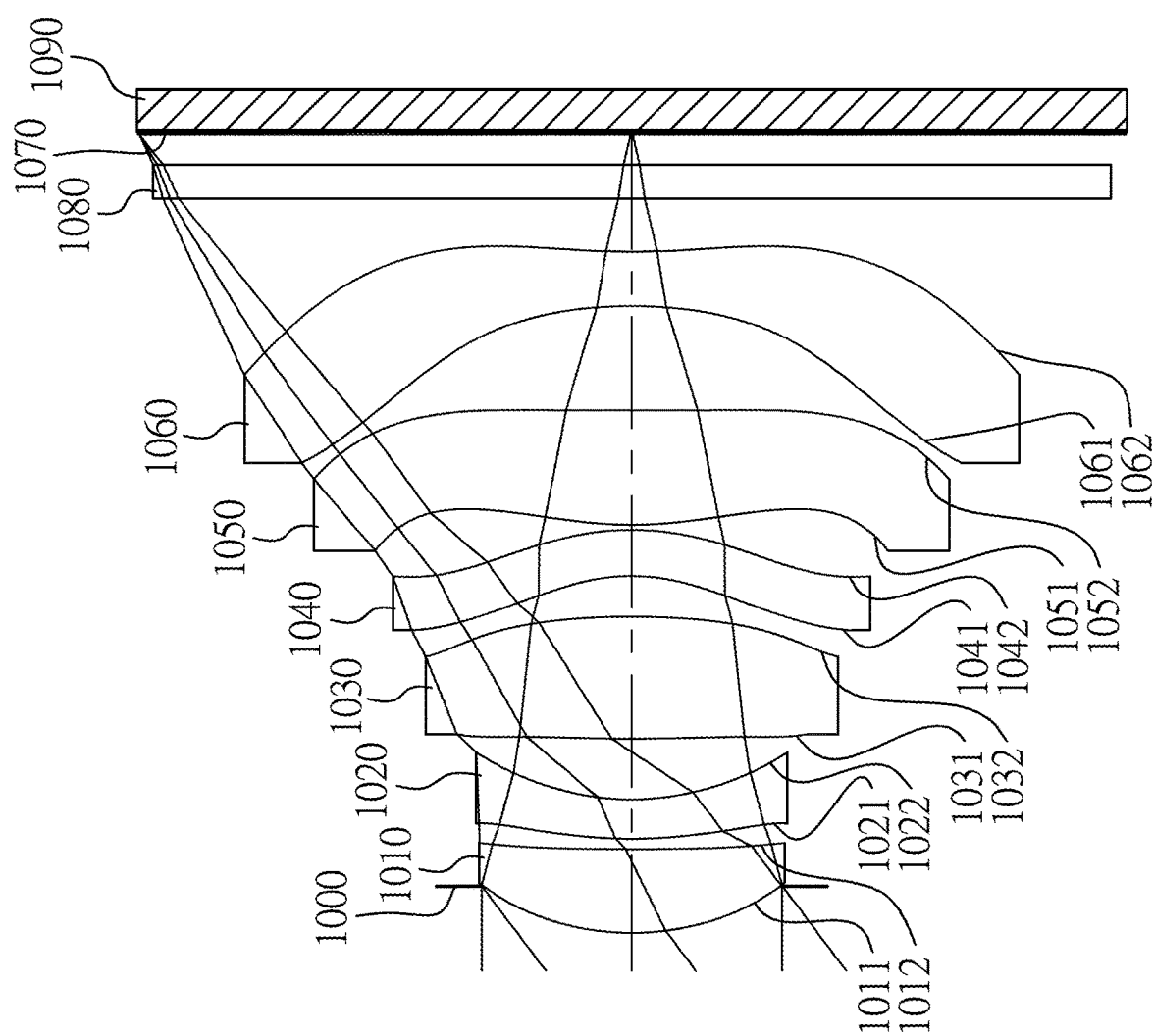
FIG. 19 is a schematic view of an optical image capturing system according to the 10th embodiment of the present disclosure.
Figure 20:
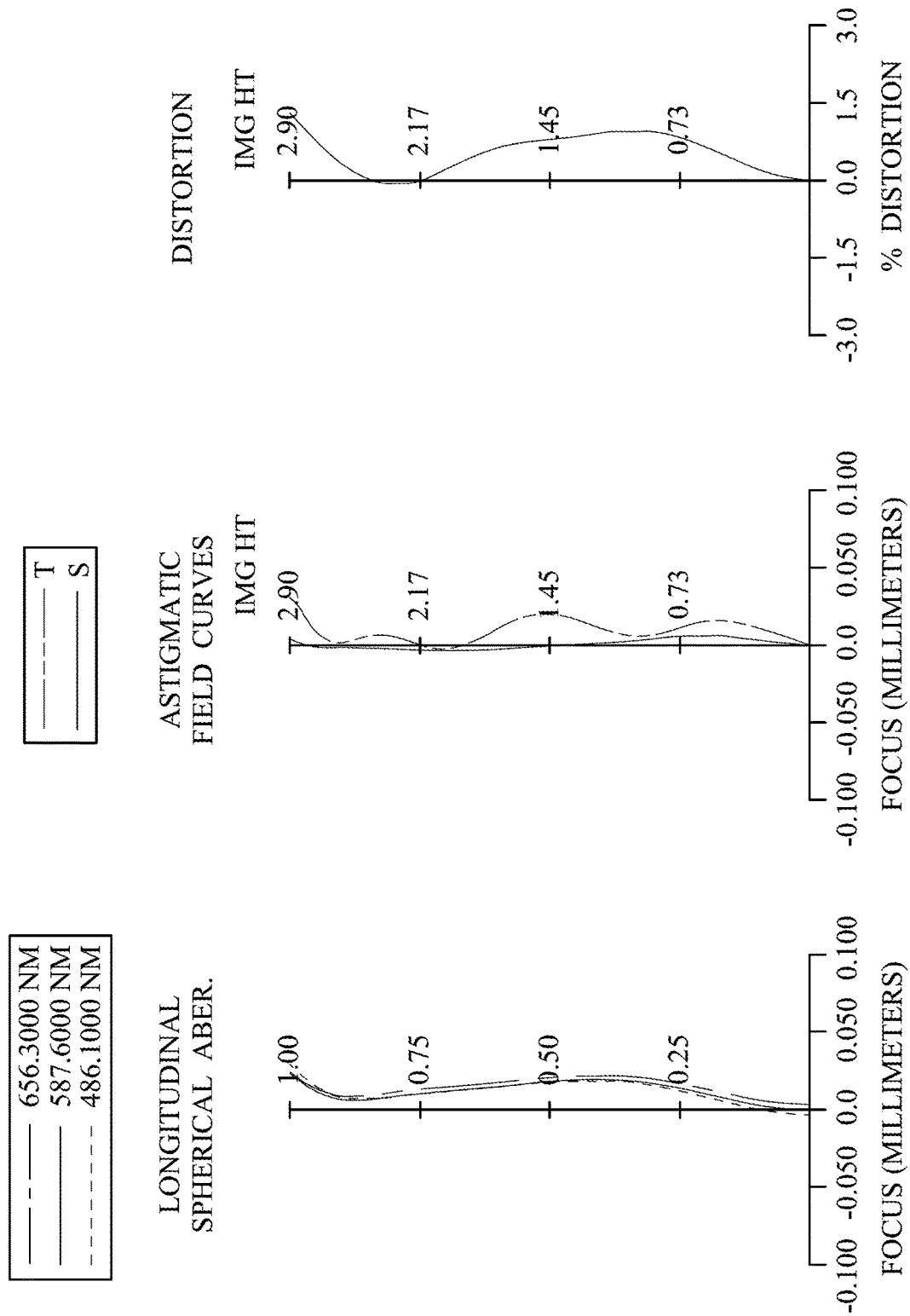
FIG. 20 shows spherical aberration curves, astigmatic field curves and a distortion curve of the optical image capturing system according to the 10th embodiment.

FIG. 19 is a schematic view of an optical image capturing system according to the 10th embodiment of the present disclosure. FIG. 20 shows spherical aberration curves, astigmatic field curves and a distortion curve of the optical image capturing system according to the 10th embodiment. In FIG. 19, the optical image capturing system includes, in order from an object side to an image side, an aperture stop 1000, a first lens element 1010, a second lens element 1020, a third lens element 1030, a fourth lens element 1040, a fifth lens element 1050, a sixth lens element 1060, an IR-cut filter 1080, an image plane 1070 and an image sensor 1090.

The first lens element 1010 with positive refractive power has a convex object-side surface 1011 and a concave image-side surface 1012, and is made of plastic material. The object-side surface 1011 and the image-side surface 1012 of the first lens element 1010 are aspheric.

The second lens element 1020 with negative refractive power has a convex object-side surface 1021 and a concave image-side surface 1022, and is made of plastic material. The object-side surface 1021 and the image-side surface 1022 of the second lens element 1020 are aspheric.

The third lens element 1030 with positive refractive power has a convex object-side surface 1031 and a convex image-side surface 1032, and is made of plastic material. The object-side surface 1031 and the image-side surface 1032 of the third lens element 1030 are aspheric.

The fourth lens element 1040 with negative refractive power has a concave object-side surface 1041 and a convex image-side surface 1042, and is made of plastic material. The object-side surface 1041 and the image-side surface 1042 of the fourth lens element 1040 are aspheric.

The fifth lens element 1050 with positive refractive power has a convex object-side surface 1051 and a convex image-side surface 1052, and is made of plastic material. The object-side surface 1051 and the image-side surface 1052 of the fifth lens element 1050 are aspheric. Furthermore, both of the object-side surface 1051 and the image-side surface 1052 of the fifth lens element 1050 have at least one inflection point.

The sixth lens element 1060 with negative refractive power has a concave object-side surface 1061 and a concave image-side surface 1062, and is made of plastic material. The object-side surface 1061 and the image-side surface 1062 of the sixth lens element 1060 are aspheric. Furthermore, both of the object-side surface 1061 and the image-side surface 1062 of the sixth lens element 1060 have at least one inflection point.

The IR-cut filter 1080 is made of glass, and located between the sixth lens element 1060 and the image plane 1070, and will not affect the focal length of the optical image capturing system.

The detailed optical data of the 10th embodiment are shown in Table 19 and the aspheric surface data are shown in Table 20 below.

TABLE 19

Embodiment 10
f = 3.79 mm, Fno = 2.15, HFOV = 37.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.277 | | | | |
| 2 | Lens 1 | 1.589 ASP | 0.495 | Plastic | 1.550 | 56.5 | 3.18 |
| 3 | | 15.292 ASP | 0.062 | | | | |
| 4 | Lens 2 | 2.621 ASP | 0.230 | Plastic | 1.640 | 23.3 | −5.71 |
| 5 | | 1.474 ASP | 0.355 | | | | |
| 6 | Lens 3 | 10.795 ASP | 0.715 | Plastic | 1.544 | 55.9 | 6.41 |
| 7 | | −5.031 ASP | 0.242 | | | | |
| 8 | Lens 4 | −1.085 ASP | 0.271 | Plastic | 1.640 | 23.3 | −7.50 |
| 9 | | −1.539 ASP | 0.030 | | | | |
| 10 | Lens 5 | 2.281 ASP | 0.670 | Plastic | 1.535 | 55.7 | 4.18 |
| 11 | | −97.719 ASP | 0.614 | | | | |
| 12 | Lens 6 | −2.729 ASP | 0.320 | Plastic | 1.535 | 55.7 | −3.18 |
| 13 | | 4.685 ASP | 0.310 | | | | |
| 14 | IR-cut filter | Plano | 0.200 | Glass | 1.517 | 64.2 | — |
| 15 | | Plano | 0.190 | | | | |
| 16 | Image | Plano | — | | | | |

Note:
Reference wavelength (d-line) is 587.6 nm.

TABLE 20

Aspheric Coefficients

| Surface # | | | | | |
|---|---|---|---|---|---|
| 2 | 3 | 4 | 5 | 6 | 7 |
| k= 4.0469E−02 | −2.8836E+01 | −2.3977E+01 | −3.2364E+00 | −1.0000E+00 | 6.8775E+00 |
| A4= 1.0984E−02 | −4.6690E−02 | −4.2646E−02 | −3.6942E−02 | −6.0780E−02 | −5.6584E−02 |
| A6= 1.8239E−02 | 2.2612E−01 | 1.6875E−01 | 1.8946E−01 | 3.6501E−02 | 5.1218E−02 |
| A8= −2.3862E−02 | −3.0115E−01 | −1.8456E−01 | −1.0378E−01 | −6.9126E−02 | −1.5544E−01 |
| A10= 5.0989E−02 | 2.0548E−01 | 1.3360E−02 | 1.7873E−03 | 7.0323E−02 | 2.3991E−01 |

TABLE 20-continued

| Aspheric Coefficients | | | | | |
|---|---|---|---|---|---|
| A12= −1.6604E−02 | −4.7578E−02 | 2.5968E−03 | −4.0393E−04 | −6.8708E−03 | −2.2834E−01 |
| A14= 2.3972E−03 | −1.7646E−02 | 2.8969E−02 | −1.1517E−02 | 2.4940E−02 | 1.2612E−01 |
| A16= −2.1914E−03 | −1.3689E−02 | −5.6179E−02 | 2.8884E−02 | −2.0075E−02 | −2.7294E−02 |

| | Surface # | | | | |
|---|---|---|---|---|---|
| 8 | 9 | 10 | 11 | 12 | 13 |
| k= −4.3219E+00 | −9.4424E−01 | −2.4672E+01 | −3.0000E+01 | 6.1317E−01 | 2.0596E−01 |
| A4= 2.1593E−02 | 8.7387E−02 | 2.0386E−02 | 6.6872E−02 | −2.8767E−02 | −8.7673E−02 |
| A6= 1.7398E−02 | −9.1194E−03 | −1.2516E−01 | −1.2942E−01 | −6.6118E−02 | −1.4839E−02 |
| A8= 3.5607E−03 | 1.9615E−02 | 1.1290E−01 | 8.7942E−02 | 6.1606E−02 | 2.5852E−02 |
| A10= −4.1205E−03 | −5.3739E−03 | −6.2672E−02 | −3.5543E−02 | −2.1036E−02 | −1.1063E−02 |
| A12= 1.1504E−03 | −7.7406E−04 | 1.7552E−02 | 8.6329E−03 | 3.6656E−03 | 2.2708E−03 |
| A14= 1.0896E−03 | 1.2650E−04 | −2.3796E−03 | −1.2172E−03 | −3.1359E−04 | −2.2617E−04 |
| A16= −7.8270E−04 | — | 1.3325E−04 | 7.8633E−05 | 1.0723E−05 | 8.6735E−06 |

In the optical image capturing system according to the 10th embodiment, the definitions of these parameters shown in the following table are the same as those stated in the 1st embodiment with corresponding values for the 10th embodiment. Moreover, these parameters can be calculated from Table 19 and Table 20 as the following values and satisfy the following relationships:

| f [mm] | 3.79 | (R3 − R4)/(R3 + R4) | 0.28 |
|---|---|---|---|
| Fno | 2.15 | (R7 − R8)/(R7 + R8) | −0.17 |
| HFOV [deg.] | 37.0 | f1/f5 | 0.76 |
| V4/V5 | 0.42 | f6/f2 | 0.56 |
| CT4/CT3 | 0.38 | Sag61/CT6 | −2.88 |
| T45/T56 | 0.05 | Yc51/Yc52 | 4.71; 1.39 |
| R9/|R10| | 0.02 | TL/ImgH | 1.62 |
| R11/R12 | −0.58 | | |

It is to be noted that TABLES 1-20 show different data of the different embodiments; however, the data of the different embodiments are obtained from experiments. Therefore, any imaging lens system of the same structure is considered to be less than or equal to the scope of the present disclosure even if it uses different data. The embodiments depicted above and the appended drawings are exemplary and are not intended to limit the scope of the present disclosure.

What is claimed is:

1. An optical image capturing system comprising six lens elements, the six lens elements being, in order from an object side to an image side:
   a first lens element, a second lens element, a third lens element, a fourth lens element, a fifth lens element and a sixth lens element;
   wherein each of the six lens elements has an object-side surface facing towards the object side and an image-side surface facing towards the image side;
   wherein the image-side surface of the third lens element is convex in a paraxial region thereof, at least one of the object-side surface and the image-side surface of the fifth lens element is aspheric and comprises at least one inflection point, the object-side surface of the sixth lens element is concave in a paraxial region thereof, and at least one of the object-side surface and the image-side surface of the sixth lens element is aspheric and comprises at least one inflection point;
   wherein an absolute value of a focal length of the third lens element is smaller than an absolute value of a focal length of the second lens element, the absolute value of the focal length of the third lens element is smaller than an absolute value of a focal length of the fourth lens element, an Abbe number of the fourth lens element is V4, an Abbe number of the fifth lens element is V5, and the following relationship is satisfied:

0.2<V4/V5≤0.38.

2. The optical image capturing system of claim 1, wherein the fourth lens element has negative refractive power.

3. The optical image capturing system of claim 1, wherein the fifth lens element has positive refractive power, the sixth lens element has negative refractive power, and the object-side surface of the third lens element is convex in a paraxial region thereof.

4. The optical image capturing system of claim 1, wherein the object-side surface of the second lens element is convex in a paraxial region thereof, the image-side surface of the second lens element is concave in a paraxial region thereof, and the image-side surface of the sixth lens element comprises the at least one inflection point.

5. The optical image capturing system of claim 1, wherein the object-side surface of the fifth lens element is convex in a paraxial region thereof.

6. The optical image capturing system of claim 1, wherein a central thickness of the third lens element is CT3, a central thickness of the fourth lens element is CT4, and the following relationship is satisfied:

0.1<CT4/CT3≤0.56.

7. The optical image capturing system of claim 1, wherein the absolute value of the focal length of the second lens element is a maximum value among absolute values of focal lengths of the six lens elements.

8. The optical image capturing system of claim 1, wherein an axial distance between the first lens element and the second lens element is greater than an axial distance between the fourth lens element and the fifth lens element.

9. The optical image capturing system of claim 1, wherein an axial distance between the second lens element and the third lens element is greater than an axial distance between the third lens element and the fourth lens element.

10. An optical image capturing system comprising six lens elements, the six lens elements being, in order from an object side to an image side:
   a first lens element, a second lens element, a third lens element, a fourth lens element, a fifth lens element and a sixth lens element;
   wherein each of the six lens elements has an object-side surface facing towards the object side and an image-side surface facing towards the image side;

wherein the image-side surface of the first lens element is concave in a paraxial region thereof, at least one of the object-side surface and the image-side surface of the fifth lens element is aspheric and comprises at least one inflection point, and at least one of the object-side surface and the image-side surface of the sixth lens element is aspheric and comprises at least one inflection point;

wherein there is an air gap in a paraxial region between each of adjacent lens elements of the six lens elements, an absolute value of a focal length of the third lens element is smaller than an absolute value of a focal length of the second lens element, the absolute value of the focal length of the third lens element is smaller than an absolute value of a focal length of the fourth lens element, the absolute value of the focal length of the fourth lens element is greater than an absolute value of a focal length of the first lens element, an Abbe number of the fourth lens element is V4, an Abbe number of the fifth lens element is V5, and the following relationship is satisfied:

$0.2<V4/V5\leq0.38$.

11. The optical image capturing system of claim 10, wherein the fourth lens element has negative refractive power.

12. The optical image capturing system of claim 10, wherein the object-side surface of the second lens element is convex in a paraxial region thereof, and the image-side surface of the second lens element is concave in a paraxial region thereof.

13. The optical image capturing system of claim 10, wherein the fifth lens element has positive refractive power, the sixth lens element has negative refractive power, the object-side surface and the image-side surface of the first lens element are both aspheric, the object-side surface and the image-side surface of the fifth lens element are both aspheric, and the object-side surface and the image-side surface of the sixth lens element are both aspheric.

14. The optical image capturing system of claim 10, wherein a central thickness of the third lens element is CT3, a central thickness of the fourth lens element is CT4, and the following relationship is satisfied:

$0.1<CT4/CT3\leq0.82$.

15. The optical image capturing system of claim 10, wherein an axial distance between the object-side surface of the first lens element and an image plane is TL, a maximum image height of the optical image capturing system is ImgH, and the following relationship is satisfied:

$TL/ImgH<1.75$.

16. The optical image capturing system of claim 10, wherein a curvature radius of the object-side surface of the fourth lens element and a curvature radius of the image-side surface of the fourth lens element have the same sign.

17. An optical image capturing system comprising six lens elements, the six lens elements being, in order from an object side to an image side:
a first lens element, a second lens element, a third lens element, a fourth lens element, a fifth lens element and a sixth lens element;
wherein each of the six lens elements has an object-side surface facing towards the object side and an image-side surface facing towards the image side;
wherein the first lens element has positive refractive power, the object-side surface of the second lens element is convex in a paraxial region thereof, the image-side surface of the fifth lens element is concave in a paraxial region thereof, at least one of the object-side surface and the image-side surface of the fifth lens element is aspheric and comprises at least one inflection point, the image-side surface of the sixth lens element is convex in a paraxial region thereof, and at least one of the object-side surface and the image-side surface of the sixth lens element is aspheric and comprises at least one inflection point;

wherein an absolute value of a focal length of the third lens element is greater than an absolute value of a focal length of the first lens element, an Abbe number of the fourth lens element is V4, an Abbe number of the fifth lens element is V5, and the following relationship is satisfied:

$0.2<V4/V5<0.6$.

18. The optical image capturing system of claim 17, wherein the second lens element has negative refractive power, and the image-side surface of the second lens element is concave in a paraxial region thereof.

19. The optical image capturing system of claim 17, wherein the fourth lens element has negative refractive power.

20. The optical image capturing system of claim 17, wherein the object-side surface of the third lens element is convex in a paraxial region thereof.

21. The optical image capturing system of claim 17, wherein the object-side surface of the fourth lens element is concave in a paraxial region thereof, and the image-side surface of the fourth lens element is convex in a paraxial region thereof.

22. The optical image capturing system of claim 17, wherein a curvature radius of the object-side surface of the second lens element is R3, a curvature radius of the image-side surface of the second lens element is R4, and the following relationship is satisfied:

$0.10<(R3-R4)/(R3+R4)<0.55$.

23. The optical image capturing system of claim 17, wherein a curvature radius of the object-side surface of the sixth lens element is R11, and a curvature radius of the image-side surface of the sixth lens element is R12, and the following relationship is satisfied:

$-1.2<R11/R12<0.2$.

24. The optical image capturing system of claim 17, wherein the absolute value of the focal length of the first lens element is a minimum value among absolute values of focal lengths of the six lens elements.

25. The optical image capturing system of claim 17, wherein a central thickness of the third lens element is smaller than a central thickness of the fifth lens element.

26. The optical image capturing system of claim 17, wherein an absolute value of a curvature radius of the object-side surface of the sixth lens element is greater than an absolute value of a curvature radius of the object-side surface of the first lens element, the Abbe number of the fourth lens element is V4, the Abbe number of the fifth lens element is V5, and the following relationship is satisfied:

$0.2<V4/V5\leq0.38$.

* * * * *